(12) United States Patent
Jiang et al.

(10) Patent No.: US 7,935,212 B2
(45) Date of Patent: May 3, 2011

(54) PROCESS FOR TRANSFERRING ONTO A SURFACE OF AN OPTICAL ARTICLE A LAYER HAVING A VARIABLE INDEX OF REFRACTION

(75) Inventors: Peiqi Jiang, Clearwater, FL (US); Haipeng Zheng, Clearwater, FL (US)

(73) Assignee: Essilor International Compagnie, Generale d'Optique Charenton-le-Pont (FR)

( * ) Notice: Subject to any disclaimer, the term of this patent is extended or adjusted under 35 U.S.C. 154(b) by 1217 days.

(21) Appl. No.: 11/461,232

(22) Filed: Jul. 31, 2006

(65) Prior Publication Data
US 2008/0023137 A1 Jan. 31, 2008

(51) Int. Cl.
| | |
|---|---|
| B29C 65/02 | (2006.01) |
| B29C 65/54 | (2006.01) |
| B32B 37/02 | (2006.01) |
| B32B 37/06 | (2006.01) |
| B32B 37/10 | (2006.01) |
| B32B 37/12 | (2006.01) |
| B32B 37/22 | (2006.01) |
| B29C 65/40 | (2006.01) |
| B29C 65/56 | (2006.01) |
| B32B 37/26 | (2006.01) |

(52) U.S. Cl. ............... 156/273.3; 156/272.2; 156/273.7; 156/275.5; 156/306.9; 156/307.1; 156/307.3

(58) Field of Classification Search .... 156/306.6–307.5, 156/272.2, 273.3, 273.7, 275.5
See application file for complete search history.

(56) References Cited

U.S. PATENT DOCUMENTS
| | | | | |
|---|---|---|---|---|
| 2,372,929 | A * | 4/1945 | Blessing | 428/164 |
| 4,679,918 | A * | 7/1987 | Ace | 351/163 |
| 5,645,767 | A * | 7/1997 | Van Gemert | 252/586 |
| 6,236,493 | B1 * | 5/2001 | Schmidt et al. | 359/296 |
| 6,562,466 | B2 * | 5/2003 | Jiang et al. | 428/412 |
| 6,712,466 | B2 * | 3/2004 | Dreher | 351/161 |

(Continued)

FOREIGN PATENT DOCUMENTS
EP 1256602 A1 * 11/2002
(Continued)

OTHER PUBLICATIONS

International Search Report and Written Opinion, issued in PCT/EP2007/057896, dated Nov. 15, 2007.

*Primary Examiner* — Philip C Tucker
*Assistant Examiner* — Sonya Mazumdar
(74) *Attorney, Agent, or Firm* — Fulbright & Jaworski L.L.P.

(57) ABSTRACT

The present invention relates to processes for transferring a coating borne by a carrier onto at least one surface of the substrate of an optical article. Specifically, the invention relates to processes for transferring any kind of patterned layer having a refractive index profile from a carrier to the surface of an optical article. The invention allows for manufacture of optical articles presenting high transmittance, low haze, and excellent adhesion performances, and in particular vision corrective optical articles that are customized and optimized to the patient's individual requirements. The invention also contemplates optical articles made by such methods.

26 Claims, 2 Drawing Sheets

U.S. PATENT DOCUMENTS

| | | | |
|---|---|---|---|
| 2002/0106482 A1* | 8/2002 | Bourlier et al. | 428/116 |
| 2003/0116270 A1* | 6/2003 | Hawa et al. | 156/307.1 |
| 2005/0140033 A1* | 6/2005 | Jiang et al. | 264/1.7 |
| 2005/0250870 A1* | 11/2005 | Jallouli | 522/182 |
| 2006/0169407 A1* | 8/2006 | Jiang | 156/380.6 |
| 2006/0219347 A1* | 10/2006 | Begon et al. | 156/99 |
| 2007/0122547 A1* | 5/2007 | Begon et al. | 427/162 |
| 2007/0285799 A1* | 12/2007 | Dreher et al. | 359/652 |
| 2008/0137032 A1* | 6/2008 | Lawrence et al. | 351/169 |

FOREIGN PATENT DOCUMENTS

| | | | |
|---|---|---|---|
| EP | 1426168 A2 | * | 6/2004 |
| GB | 2082107 | | 3/1982 |
| WO | WO 97/42530 | | 11/1997 |
| WO | WO 03004255 A2 | * | 1/2003 |
| WO | WO 2004/015481 | * | 2/2004 |
| WO | WO 2004/034095 | * | 4/2004 |
| WO | WO 2004/106990 | * | 12/2004 |
| WO | WO 2005/085912 | | 3/2005 |

* cited by examiner

PROCESS FOR TRANSFERRING ONTO A SURFACE OF AN OPTICAL ARTICLE A LAYER HAVING A VARIABLE INDEX OF REFRACTION

BACKGROUND OF THE INVENTION

1. Field of the Invention

The present invention relates to a process for preparing an optical article having a layer with a variable index of refraction involving transferring a coating or a stack of coatings from a carrier to at least one geometrically defined surface of the substrate of said optical article. The process can be implemented in a short period of time without any risk of deformation of the substrate.

The invention also relates to a coated carrier for use in the above process.

2. Description of Related Art

It is a common practice in the art to coat at least one main surface of a lens substrate, such as an ophthalmic lens or lens blank, with several coatings for imparting to the finished lens additional or improved optical or mechanical properties. These coatings are designated in general as functional coatings.

Thus, it is usual practice to coat at least one main surface of a lens substrate, typically made of an organic glass material, with successively, starting from the surface of the lens substrate, an impact-resistant coating (impact resistant primer), an abrasion- and/or scratch-resistant coating (hard coat), an anti-reflection coating and, optionally, an anti-fouling top coat. Other coatings, such as a polarized, photochromic or dyeing coating may also be applied onto one or both surfaces of the lens substrate.

Numerous processes and methods have been proposed for coating a surface of optical articles. U.S. Pat. No. 6,562,466 and U.S. Pat. Appl. Nos. 2005/0140033 and 2005/250870 describe a process for transferring or applying coatings from at least one support or mold part onto at least a geometrically defined surface of a lens blank comprising:

providing a lens blank having at least one geometrically defined surface;

providing a support or mold part having an internal surface bearing a coating and an external surface;

depositing onto said geometrically defined surface of said lens blank or onto said coating a pre-measured amount of a curable adhesive composition;

moving relatively to each other the lens blank and the support to either bring the coating into contact with the curable adhesive composition or bring the curable adhesive composition into contact with the geometrically defined surface of the lens blank;

applying a sufficient pressure onto the external surface of the support so that the thickness of a final adhesive layer once the curable composition cured is less than 100 micrometers;

curing the layer of adhesive composition; and withdrawing the support or mold part to recover the lens blank with the coating adhered onto the geometrically defined surface of said lens blank.

U.S. Pat. No. 6,562,466 and U.S. Pat. Appl. Nos. 2005/0140033 and 2005/250870 use a liquid light- or thermally-curable adhesive composition during the transfer of the coating layers from the carrier to the surface of the lens substrate. The liquid curable adhesive composition is required to stick both to the exposed coating on the carrier and the geometrically defined surface of the lens substrate. The total thickness of the transferred coating layers is typically less than 50 μm.

Currently, there seems no fast and low cost way to realize patterned ophthalmic articles designed and optimized to the patient's individual requirements, and more generally, optical articles.

Optical articles generally have a homogeneous refractive index. A refractive index profile in an optical material offers an additional degree of freedom with regard to the use of the article. Actually, the refractive index profile allows the optical path of the rays to be varied independently of the geometry of the article.

The manufacturing methods described in the prior art for creating specific functional lenses having refractive index profiles are very costly due to the amount of time and expertise required.

U.S. Pat. No. 6,712,466, WO 2004/034095, WO 2004/015481 and WO 2004/106990, all to Ophtonix, Inc., describe an optical article called "wavefront aberrator," which uses a variable index layer. It includes a cavity that is sandwiched between a pair of transparent plates or windows, typically lenses. The cavity is filled with one or more monomers, or pre-polymers, monomer mixtures and polymerization initiators. This polymerizable resin composition exhibits an index of refraction change as it polymerizes, and the change can be controlled by the extent of its polymerization degree, or curing. The refractive index of the composition may be controlled as a function of position across and through the composition layer, so as to create a predetermined three-dimensional refractive index profile.

However, the above described invention has a lot of drawbacks in the real practice and is also not cost effective, since all the lenses or semi-finished lenses to be stored are required to be provided with a variable index coating layer during the lens manufacture. A problem may come out with mass production or patients' specific requirements for lens substrates. It is hard to cover all the lens materials including polarized or photochromic lens materials.

Consequently, a need exists for a low cost and easy process for preparing patterned optical articles.

SUMMARY OF THE INVENTION

Therefore, a first object of the invention is to provide a process for transferring any kind of patterned layer having a refractive index profile from a carrier to the surface of an optical article, which would be more flexible than prior art processes, and wherein said patterned layer would have a large thickness range from a few nanometers to several tenths of micrometers.

Another object of the invention is to provide a process as above, in which radiation protection could be easily introduced to ensure stability of the refractive index profile layer in the case when said refractive index profile has been created by irradiation.

Yet another object of the invention is to provide a process which delivers optical articles presenting high transmittance, low haze, and excellent adhesion performances, and in particular vision corrective optical articles that are entirely customized and optimized to the patient's individual requirements.

A further object of the invention is to provide a process which could be easily integrated into the classical manufacturing chain, without requiring significant modifications of the transfer processes already in use.

Still a further object of this invention is to provide a carrier for use in the above process, bearing a coating which exhibits a varied index of refraction across and/or through its surface.

Such a carrier would be particularly interesting if it could be stored in view of a subsequent implementation in a transfer process.

To achieve the foregoing objects, and in accordance with the invention as embodied and broadly described herein, the present invention relates to a process for transferring a coating or a stack of coatings borne by a removable carrier onto at least one geometrically defined surface of the substrate of an optical article, said carrier bearing an outermost coating having an exposed surface, comprising:

a) obtaining a carrier having a main surface;
b) depositing a layer of a curable composition onto the main surface of the carrier;
c) obtaining an optical article comprising a substrate having at least one geometrically defined surface;
d) depositing either onto the exposed surface of the outermost coating borne by the carrier or onto said at least one geometrically defined surface of the substrate a layer of a composition capable of allowing adhesion of said exposed surface to said at least one geometrically defined surface of the substrate;
e) moving the carrier and the optical article relatively to each other to bring the deposited layer of composition capable of allowing adhesion into contact with either said at least one geometrically defined surface of the substrate or said exposed surface;
f) pressing together the at least one geometrically defined surface of the substrate and the exposed surface of the outermost coating borne by the carrier, said layer of composition capable of allowing adhesion lying there between;
g) optionally, heating or curing the layer of composition capable of allowing adhesion during pressing step f);
h) stopping pressing step f); and
i) withdrawing the removable carrier to recover an optical article having a substrate coated with at least one coating adhering to said at least one geometrically defined surface through the layer of composition allowing adhesion, wherein the layer which has been deposited at step b) is cured prior to step e) and subjected prior to step e) to a treatment step allowing to obtain a coating having at least one region which exhibits a refractive index profile.

The present invention also encompasses the case in which the composition capable of allowing adhesion is pre-deposited either on the exposed surface of the outermost coating borne by the carrier or a geometrically defined surface of the substrate, which may be stored and later used in the process steps e) to i) of the invention.

The present invention also relates to a carrier having a main surface bearing a coating having at least one region which exhibits a refractive index profile.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings wherein.

DETAILED DESCRIPTION OF THE INVENTION AND PREFERRED EMBODIMENTS

Figure 1:
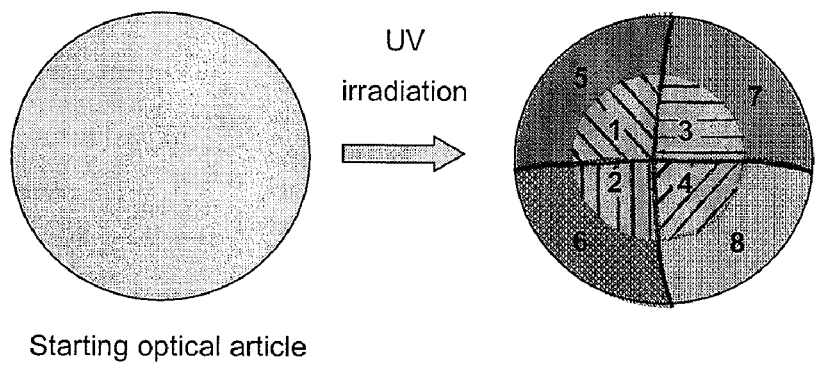
FIGS. 1 to 3 show schematic top views of optical articles having different refractive index profiles which have been created by implementation of the inventive process.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

When the optical article or carrier comprises one or more surface coatings, the term "to deposit a layer onto the optical article or carrier" means that a layer is deposited onto the exposed surface of the outermost coating of the optical article or carrier.

By outermost (or outer) and innermost coatings of a coating stack borne by a carrier, it is meant the coatings of the coating stack which are respectively the furthest from and the closest to the carrier.

A coating or a layer that is "on" a carrier or has been deposited "onto" a carrier is defined as a coating or layer that: (i) is positioned over the carrier, (ii) need not be in contact with the carrier, i.e., one or more intervening coatings may be disposed between the carrier and the coating or layer in question, and (iii) need not cover the carrier completely.

According to the invention, the optical article to be coated with the coating stack borne by the carrier comprises a substrate, in mineral or organic glass having rear and front main faces.

The optical article of the present invention preferably is a transparent optical article, more preferably a lens, and even more preferably an ophthalmic lens, which may be finished or semi-finished.

A finished lens is defined as a lens obtained in its definitive shape, having both of its main faces surfaced or cast to the required geometry. It is generally produced by pouring polymerizable compositions between two molds exhibiting required surface geometries and then polymerizing.

A semi-finished lens is defined as a lens having only one of its main faces (generally the front face of the lens) surfaced or cast to the required geometry. The remaining face, preferably the rear face of the lens, has then to be surface-finished to the desired shape.

The geometrically defined surface of the substrate of the optical article onto which the coatings are to be transferred may be a flat, spherical, toric or progressive surface, either coated with functional coatings or uncoated. By geometrically defined surface, it is meant either an optical surface, that is a surface of required geometry and smoothness, or a surface having a required geometry but that still exhibits some roughness, such as a surface that has been grinded and fined, but not polished, or polished but still having individual scratches.

Optical articles such as ophthalmic lenses are classically subjected to a surface mechanical treatment. This mechanical treatment comprises a group of operations leading to the production of a lens having the required geometry, i.e. the desired curvature (optical power). The mechanical treatment typically comprises three successive steps: grinding, fine grinding (also called fining) and polishing.

Grinding is a mechanical processing step intended to create the curvature on a face of the lens substrate.

Fine grinding (fining), performed after grinding further changes the geometry of the treated face of the substrate, which still shows significant surface roughness.

Finally, the polishing, a relatively long mechanical processing step, which usually does not change the geometry of the treated face, removes the remaining roughness as far as possible to give the final transparent substrate.

Thus, the surface of the substrate of the optical article used in the present invention may be polished or only fined without having been polished, or polished but still having individualized scratches.

The geometrically defined surface of the substrate to be coated is not necessarily a naked surface, i.e. a surface free of any deposited coating layer, it can also be a surface already covered with one or more functional coatings, for example an impact-resistant coating (primer coating), an abrasion- and/or scratch-resistant coating (hard coat), a polarized coating, a photochromic coating, a dyeing coating, in particular a primer coating.

A whole main surface of the substrate, or only a portion of which, may be coated using the process according to the present invention. In the case of a lens, the coating stack is preferably transferred onto a geometrically defined surface of the rear (concave) main surface of the substrate. In such a case, the coating transfer process is referred to as a BST (back side transfer) process. Obviously, geometrically defined surfaces of front (convex) main surface or both rear and front surface of the substrate can be coated using the process of the invention. When the coating stack is transferred onto a geometrically defined surface of the front (convex) main surface of the substrate, the coating transfer process is referred to as a FST (front side transfer) process.

In the case of a lens, the rear (back) surface (generally the concave face) of the substrate is the surface of the lens substrate which, in use, is the closest to the wearer's eye. The front surface (generally the convex surface) of the lens substrate is the surface of the lens substrate which, in use, is the farthest from the wearer's eye.

The substrate may be made of mineral glass or organic glass, preferably organic glass (polymer substrate). The organic glasses can be made of any material currently used for organic ophthalmic lenses, e.g., thermoplastic materials such as polycarbonates and thermoplastic polyurethanes or thermosetting (cross-linked) materials such as those obtained by polymerization of allyl derivatives such as the allyl carbonates of linear or branched aliphatic or aromatic polyols, such as ethylene glycol bis(allyl carbonate), diethylene glycol bis (2-methyl carbonate), diethylene glycol bis(allyl carbonate), ethylene glycol bis(2-chloroallyl carbonate), triethylene glycol bis(allyl carbonate), 1,3-propanediol bis(allyl carbonate), propylene glycol bis(2-ethylallyl carbonate), 1,3-butenediol bis(allyl carbonate), 1,4-butenediol bis(2-bromoallyl carbonate), dipropylene glycol bis(allyl carbonate), trimethylene glycol bis(2-ethylallyl carbonate), pentamethylene glycol bis (allyl carbonate), isopropylene bisphenol-A bis(allyl carbonate), poly(meth)acrylates and copolymers based substrates, such as substrates obtained by the polymerization of alkyl methacrylates, in particular $C_1$-$C_4$ alkyl methacrylates such as methyl(meth)acrylate and ethyl(meth)acrylate, substrates comprising (meth)acrylic polymers and copolymers derived from bisphenol-A, polyethoxylated aromatic (meth)acrylates such as the polyethoxylated bisphenolate di(meth)acrylates, polythio(meth)acrylates, thermosetting polyurethanes, polythiourethanes, polyepoxides, polyepisulfides, as well as copolymers thereof and blends thereof.

Substrates particularly recommended are polycarbonates, for example those made from bisphenol-A polycarbonate, sold under the trade names LEXAN® by General Electric or MAKROLON® by Bayer AG, or those incorporating carbonate functional groups, in particular substrates obtained by polymerization or copolymerization of diethylene glycol bis (allyl carbonate), sold under the trade name CR-39® by PPG INDUSTRIES (ORMA® ESSILOR lens).

Among other recommended substrates are substrates obtained by polymerization of thio(meth)acrylic monomers, such as those disclosed in the French patent application FR 2734827.

The substrates may obviously be obtained by polymerizing mixtures of the above monomers. By (co)polymer, it is meant a copolymer or polymer. By (meth)acrylate, it is meant an acrylate or methacrylate.

The geometrically defined surface of the substrate to be coated or the exposed surface of the coating or layer or stack borne by the carrier is preferably subjected before step d) to a pre-treatment intended to promote adhesion of the layer of composition capable of allowing adhesion which will be subsequently deposited. The surface subjected to the pre-treatment is the one which undergoes deposition step d).

Any physical or chemical adhesion promoting pre-treatment step can be performed. Preferably, as a pre-treatment step, a high-frequency discharge plasma method, a glow discharge plasma method, a corona discharge treatment, a bombardment with energetic species, for example an electron beam method or an ion beam method ("Ion Pre-Cleaning" or "IPC") is employed. Such pre-treatments are usually performed under vacuum. An acid or base (NaOH) or solvent pre-treatment may also be used. More preferably, the pre-treatment is a corona discharge treatment.

By energetic species, it is meant species with an energy ranging from 1 to 150 eV, preferably from 10 to 150 eV, and more preferably from 40 to 150 eV. Energetic species may be chemical species such as ions, radicals, or species such as photons or electrons.

According to the invention, the carrier is employed to transfer a coating exhibiting a refractive index profile in at least one region, or a stack of functional coatings comprising a coating exhibiting a refractive index profile in at least one region.

The carrier, at least one a main surface of which bears the coating or stack of coatings to be transferred, is a rigid or flexible carrier, preferably a flexible carrier.

When using a rigid carrier, the base curvature of the internal surface of the carrier is preferably the same as the base curvature of the surface of the substrate to be coated. The internal surface of the coated carrier, i.e. its surface which is intended to come into contact with the composition capable of allowing adhesion, inversely replicates the geometry of the surface of the optical article to be coated.

When using a flexible, deformable, carrier, the base curvature of the internal surface of the carrier is preferably higher than the base curvature of the surface of the substrate to be coated, especially when the back (concave) surface of the substrate has to be coated. The internal surface of the coated carrier inversely replicates the geometry of the surface of the optical article to be coated under the pressure applied in step e). In this case, it is only necessary to provide the carrier with a surface, the geometry of which conforms to the general shape of the optical surface of the substrate onto which the coating stack is to be applied, either of concave or convex shape, but it is not necessary that this surface strictly corresponds to the geometry of the substrate surface to be coated. Thus, the same flexible carrier can be used for applying coatings onto substrates having surfaces of different specific geometries.

Generally, the carrier has a spherical shape and two parallel main surfaces, and consequently has an even thickness. It is preferably radiation transparent, more preferably light transparent, in particular UV-transparent, thus permitting UV curing of UV curable adhesive compositions and/or generation of a refractive index profile by UV irradiation.

The carrier may be a mold part. Its internal surface may have a relief organized according to a pattern, in other words, may be microstructured and may confer to the final optical article properties imparted by the microstructure (for example anti-reflective properties). Different techniques for obtaining a microstructured mold part are disclosed in WO 99/29494.

The carrier is a removable carrier, i.e. a carrier that is intended to be removed at the end of the coating transfer process, so that only the stack of coatings is transferred to the geometrically defined surface of the substrate after completion of the process. The preferred flexible carriers are thin supporting elements made of a plastic material especially a thermoplastic material. Examples of thermoplastic (co)polymers, which can be used for making the carrier are polysulfones, aliphatic poly(meth)acrylates, such as methyl poly(meth)acrylate, polyethylene, polypropylene, polystyrene, SBM (styrene-butadiene-methyl methacrylate) block copolymers, polyphenylene sulfide, arylene polyoxides, polyimides, polyesters, polycarbonates such as bisphenol A polycarbonate, PVC, polyamides such as the nylons, other copolymers thereof, and mixtures thereof. The preferred thermoplastic material is polycarbonate.

Generally, the removable carrier has a thickness of 0.2 to 5 mm, preferably of 0.5 to 2 mm.

Optionally, the carrier is first coated with a layer of protecting and releasing coating, which will protect the coating stack. It is generally removed after having implemented the process of the invention. In one embodiment, the anti-fouling top coat defined below advantageously acts as a non-removable release agent layer. In another embodiment, said layer of protecting and releasing coating is not transferred and stays on the carrier when it is removed during step i).

The carrier which is obtained at step a) may bear one or more functional coatings which may be selected from, without limitation, an anti-fouling top coat, an anti-reflection coating optionally comprising an antistatic layer, an anti-abrasion- and/or scratch-resistant coating, an impact-resistant coating, a polarized coating, a photochromic coating, an antistatic coating, a dyed coating, a printed layer, a microstructured layer.

The coatings are applied onto the surface of the carrier in the reverse order with regard to the desired order of the coating stack on the substrate. When present, the anti-fouling top coat, the anti-reflection coating, the abrasion- and/or scratch-resistant coating, and the impact-resistant coating are generally deposited onto the carrier in the order they were cited.

The coating exhibiting a refractive index (RI) profile, which will be called the "RI changing coating", is obtained from the layer of a curable composition which is deposited onto the main surface of the carrier at step b) of the inventive process. According to the invention, the RI profile is first created, preferably by curing and/or irradiating said layer following a predetermined curing and/or irradiation plan and then transferred to an optical article when needed. Advantageously, the inventive process does not lead to any appreciable change of the RI profile of said RI changing coating during the transfer step.

The RI changing coating may be located at different positions in the coating stack to be transferred. In one embodiment of the invention, it is the coating of the coating stack which will be in contact with the layer of composition capable of allowing adhesion in the final optical article, and consequently at least from step f) of the inventive process. In other embodiments, the RI changing coating is interleaved between two functional coatings, for instance between an anti-reflection coating and an abrasion- and/or scratch-resistant coating, between an abrasion- and/or scratch-resistant coating and an impact-resistant coating or between an anti-reflection coating and an impact-resistant coating.

In a preferred embodiment, the layer of a curable composition which is deposited at step b) of the inventive process is deposited onto an impact-resistant coating or an abrasion- and/or scratch-resistant coating borne by the carrier. Preferably, it is not directly deposited onto the carrier or the optional releasing coating. Still preferably, the RI changing coating is not interleaved between two layers of the anti-reflection coating.

The layer of anti-fouling top coat, which in the finished optical article generally constitutes the outermost coating on the substrate, is a low surface energy top coat. If present, it will generally be coated with the AR coating. It is intended to improve dirty mark resistance of the finished optical article and in particular of the anti-reflection coating.

The anti-fouling top coat is defined as a hydrophobic and/or oleophobic surface coating. The ones preferably used in this invention are those which reduce surface energy of the article to less than 20 mJ/m². The invention has a particular interest when using anti-fouling top coats having a surface energy of less than 14 mJ/m² and even better less than 12 mJ/m².

The surface energy values referred above are calculated according to Owens Wendt method, described in the following document: Owens, D. K.; Wendt, R. G. "Estimation of the surface force energy of polymers", *J. Appl. Polym. Sci.* 1969, 51, 1741-1747.

As known in the art, a hydrophobic top coat is a layer having a stationary contact angle with deionized water of at least 60°, preferably at least 75°, more preferably at least 90°, even better more than 100° and ideally more than 110°.

The stationary contact angle with water is determined according to the liquid drop method in which a water drop having a diameter smaller than 2 mm is formed on the optical article and the contact angle is measured.

The anti-fouling top coat according to the invention is preferably of organic nature. By organic nature, it is meant a layer which is comprised of at least 40% by weight, preferably at least 50% by weight of organic materials, relative to the total weight of the coating layer. A preferred anti-fouling top coat is made from a liquid coating material comprising at least one fluorinated compound.

Hydrophobic and/or oleophobic surface coatings most often comprise silane-based compounds bearing fluorinated groups, in particular fluorinated hydrocarcarbons, perfluorocarbons, fluorinated polyethers such as $F_3C-(OC_3F_6)_{24}-O-(CF_2)_2-(CH_2)_2-O-CH_2-Si(OCH_3)_3$ and perfluoropolyethers.

By way of example, silazane, polysilazane, silicon compounds such as silicon-containing organic fluoropolymers are to be mentioned, comprising one or more fluorine-containing groups such as those mentioned here above. Such compounds have been widely disclosed in the previous art, for example in patents U.S. Pat. No. 4,410,563, U.S. Pat. No. 6,183,872, U.S. Pat. No. 6,277,485, EP 0203730, EP 749021, EP 844265 and EP 933377.

Commercial compositions for making anti-fouling top coats are the compositions KY130® and KP 801M® (which comprises an organosilazane) commercialized by Shin-Etsu Chemical and the composition OPTOOL DSX® (a fluorine-based resin comprising perfluoropropylene moieties) commercialized by Daikin Industries. OPTOOL DSX® is the most preferred coating material for anti-fouling top coats.

The liquid coating material for forming the anti-fouling top coat of the invention may comprise one or more of the above cited compounds. Preferably, such compounds or mixtures of compounds are liquid or can be rendered liquid by heating, thus being in a suitable state for deposition.

The technique for depositing such anti-fouling top coats onto the carrier are very diverse, including liquid phase deposition such as dip coating, spin coating, spray coating, or vapor phase deposition (vacuum evaporation). Of which, deposition by spin or dip coating is preferred.

If the anti-fouling top coat is applied under a liquid form, at least one solvent is added to the coating material so as to prepare a liquid coating solution with a concentration and viscosity suitable for coating, preferably fluorinated solvents and alcanols. Deposition is followed by curing.

Anti-reflection coatings and their methods of making are well known in the art. The anti-reflection coating of the present invention may include any layer or stack of layers which improves the anti-reflective properties of the finished optical article over at least one portion of the visible spectrum, thereby increasing the transmission of light and reducing surface reflectance at the article-air interface.

The anti-reflection coating may be a mono- or multilayered anti-reflection coating, and preferably comprises a mono- or multilayered film of dielectric materials.

Although the anti-reflection coating preferably comprises an alternated stack of low refractive index (LI) and high refractive index (HI) layers, in another embodiment of the invention, LI and HI layers are not necessarily alternated in the AR coating.

As used herein, a low refractive index layer is intended to mean a layer with a refractive index of 1.55 or less, preferably lower than 1.50 and even better lower than 1.45, and a high refractive index layer is intended to mean a layer with a refractive index higher than 1.55, preferably higher than 1.6, more preferably higher than 1.8 and even better higher than 2, both at a reference wavelength of 550 nm. Unless otherwise noted, all refractive indexes indicated in the present patent application are expressed at 25° C. and $\lambda=550$ nm.

HI layers are classical high refractive index layers and may comprise, without limitation, one or more mineral oxides such as $TiO_2$, $PrTiO_3$, $LaTiO_3$, $ZrO_2$, $Ta_2O_5$, $Y_2O_3$, $Ce_2O_3$, $La_2O_3$, $Dy_2O_5$, $Nd_2O_5$, $HfO_2$, $Sc_2O_3$, $Pr_2O_3$ or $Al_2O_3$, or $Si_3N_4$, as well as mixtures thereof, preferably $TiO_2$ or $PrTiO_3$.

LI layers are also well known and may comprise, without limitation, $SiO_2$, $MgF_2$, $ZrF_4$, $Al_2O_3$, $AlF_3$, chiolite ($Na_3Al_3F_{14}$), cryolite ($Na_3[AlF_6]$), or mixtures thereof, preferably $SiO_2$ or $SiO_2$ doped with $Al_2O_3$.

Generally, HI layers have a physical thickness ranging from 10 to 120 nm, and LI layers have a physical thickness ranging from 10 to 100 nm.

Preferably, the total physical thickness of the anti-reflection coating is lower than 1 micrometer, more preferably lower than or equal to 500 nm and even better lower than or equal to 250 nm. The total physical thickness of the anti-reflection coating is generally higher than 100 nm, preferably higher than 150 nm.

The anti-reflection coating is generally applied by vacuum deposition according to one of the following techniques: i) by evaporation, optionally assisted by ion beam; ii) by ion-beam spraying; iii) by cathodic spraying; iv) by chemical vapor deposit assisted by plasma.

In addition to vacuum deposition, the anti-reflection coating can also be applied by depositing a liquid solution, preferably by a spin coating process. As an example, it is possible to apply an inorganic layer by the sol/gel route, for example from a tetraethoxysilane hydrolyzate.

In the case of a single layer film, its optical thickness is preferably equal to $\lambda/4$, where $\lambda$ is a wavelength of 450 to 650 nm.

In the case of a multilayer film comprising three layers, a combination may be used corresponding to the respective optical thicknesses $\lambda/4$, $\lambda/2$, $\lambda/4$ or $\lambda/4$, $\lambda/4$, $\lambda/4$.

It is also possible to use an equivalent coating made up of more layers, instead of any number of the layers which are part of the above-mentioned three layers.

Preferably, the anti-reflection coating is a multilayer film comprising three or more dielectric material layers of alternatively high (HI) and low (LI) refractive indexes.

A preferred anti-reflection coating comprises a stack of four layers formed by vacuum deposition, for example a first $SiO_2$ layer having an optical thickness of about 100 to 160 nm, a second $ZrO_2$ layer having an optical thickness of about 120 to 190 nm, a third $SiO_2$ layer having an optical thickness of about 20 to 40 nm and a fourth $ZrO_2$ layer having an optical thickness of about 35 to 75 nm, the layers being deposited onto the carrier, which may already be coated with one or more coatings, from the fourth to the first (i.e., the reverse order they should be present on the finished optical article).

Preferably, after deposition of the above four-layer anti-reflecting stack, a $SiO_2$ sub-layer is deposited to promote the adhesion between the anti-reflection stack and the abrasion and/or scratch-resistant coating generally subsequently deposited.

Before applying the subsequent coating onto the AR coating, it is possible to subject the surface of the AR coating to a physical or chemical pre-treatment step such as described above so as to increase adhesion of the layers.

The next layer to be deposited generally is an abrasion and/or scratch-resistant coating.

Any known optical abrasion- and/or scratch-resistant coating composition can be used to form the abrasion- and/or scratch-resistant coating of the invention. Thus, the abrasion- and/or scratch-resistant coating composition can be a UV and/or a thermally curable composition.

By definition, an abrasion- and/or scratch-resistant coating is a coating which improves the abrasion- and/or scratch-resistance of the finished optical article as compared to a same optical article but without the abrasion- and/or scratch-resistant coating. Preferred coating compositions are (meth)acrylate based coatings.

The main component of the (meth)acrylate based coating compositions may be chosen from monofunctional (meth)acrylates and multifunctional (meth)acrylates such as difunctional (meth)acrylates, trifunctional (meth)acrylates, tetrafunctional (meth)acrylates, pentafunctional (meth)acrylates, hexafunctional (meth)acrylates.

Other preferred abrasion- and/or scratch-resistant coatings are silicon containing coatings, especially those obtained by curing a precursor composition including silanes or a hydrolyzate thereof, preferably epoxysilanes, and more preferably the epoxyalkoxysilanes disclosed in FR 2702486, WO 94/10230, U.S. Pat. No. 4,211,823 and U.S. Pat. No. 5,015,523.

A particularly preferred composition for an abrasion- and/or scratch-resistant coating is disclosed in FR 2702486. Said preferred composition comprises a hydrolyzate of an epoxytrialkoxysilane and dialkyldialkoxysilane, colloidal mineral fillers and a catalytic amount of an aluminum-based curing catalyst, the remaining of the composition being essentially comprised of solvents typically used for formulating these compositions. A surfactant is also preferably added in the composition so as to improve the optical quality of the deposit.

Especially preferred epoxyalkoxysilane based abrasion- and/or scratch-resistant coating compositions are those comprising as the main constituents an hydrolyzate of γ-glycidoxypropyl-trimethoxysilane (GLYMO) as the epoxytrialkoxysilane component, an hydrolyzate of dimethyldiethoxysilane (DMDES) as the dialkyldialkoxysilane component, colloidal silica and a catalytic amount of aluminum acetylacetonate.

In order to improve the adhesion of the abrasion- and/or scratch-resistant coating to the impact-resistant primer coating which is generally subsequently deposited, or to the RI changing coating for example, an effective amount of at least one coupling agent can be added to the abrasion- and/or scratch-resistant coating composition. The preferred coupling agent is a pre-condensed solution of an epoxyalkoxysilane such as GLYMO and an unsaturated alkoxysilane, preferably comprising a terminal ethylenic double bond such as acryloxypropyl trimethoxysilane.

The abrasion- and/or scratch-resistant coating composition can be applied, generally onto the AR coating or the RI changing layer using any classical method such as spin, dip or flow coating.

The abrasion- and/or scratch-resistant coating composition can be simply dried or optionally pre-cured before application of a subsequent coating, generally the primer coating, or the RI changing coating. Depending upon the nature of the abrasion- and/or scratch-resistant coating composition, thermal curing, UV-curing or a combination of both can be used.

Thickness of the abrasion- and/or scratch-resistant coating, after curing, usually ranges from 1 to 15 µm, preferably from 2 to 6 µm, preferably from 3 to 5 µm.

Before applying the subsequent coating onto the abrasion and/or scratch-resistant coating, it is possible to subject the surface of the abrasion and/or scratch-resistant coating to a pre-treatment step such as described above.

The impact-resistant primer coating which may be used in the present invention can be any coating typically used for improving impact resistance of a finished optical article. Also, this coating generally enhances adhesion, if present, of the abrasion and/or scratch-resistant coating on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth)acrylic based coatings and polyurethane based coatings. (Meth)acrylic based impact-resistant coatings are, among others, disclosed in U.S. Pat. Nos. 5,015,523 and 6,503,631 whereas thermoplastic and cross-linked based polyurethane resin coatings are disclosed inter alia, in Japanese Pat. Nos. 63-141001 and 63-87223, EP Pat. No. 0404111 and U.S. Pat. No. 5,316,791.

In particular, the impact-resistant primer coating according to the invention can be made from a latex composition such as a poly(meth)acrylic latex, a polyurethane latex or a polyester latex.

Among the preferred (meth)acrylic based impact-resistant primer coating compositions there can be cited polyethylene glycol (meth)acrylate based compositions such as, for example, tetraethylene glycoldiacrylate, polyethylene glycol (200) diacrylate, polyethylene glycol (400) diacrylate, polyethylene glycol (600) di(meth)acrylate, as well as urethane (meth)acrylates and mixtures thereof.

Preferably, the impact-resistant primer coating has a glass transition temperature (Tg) of less than 30° C. Among the preferred impact-resistant primer coating compositions, there may be cited the acrylic latex commercialized under the name Acrylic latex A-639 by Zeneca and polyurethane latexes commercialized under the names Witcobond® 240 and Witcobond® 234 by Baxenden Chemicals.

In a preferred embodiment, the impact-resistant primer coating may also include an effective amount of a coupling agent in order to promote adhesion of the primer coating to the optical substrate and/or to the scratch-resistant coating or any other coating. The same coupling agents as for the abrasion and/or scratch-resistant coating compositions described above can be used with the impact-resistant coating compositions.

The impact-resistant primer coating composition can be applied onto the underlying coating using any classical method such as spin, dip, or flow coating.

The impact-resistant primer coating composition can be simply dried or optionally pre-cured before application of a subsequent coating. Depending upon the nature of the impact-resistant primer coating composition, thermal curing, UV-curing or a combination of both can be used.

Thickness of the impact-resistant primer coating, after curing, typically ranges from 0.05 to 30 µm, preferably 0.5 to 20 µm and more particularly from 0.6 to 15 µm, and even better 0.6 to 5 µm.

According to the invention, the layer which has been deposited at step b) of the inventive process is subjected to a treatment step allowing to obtain a coating having at least one region which exhibits a refractive index profile.

Preferably, the layer which has been deposited at step b) of the inventive process is cured and/or irradiated according to a predetermined curing and/or irradiation plan, so as to obtain said coating having at least one region which exhibits a refractive index profile. As previously explained, said layer (or coating) is called "a refractive index (RI) changing" layer (or coating) or "a refractive index profile" layer (or coating).

In the final optical article, the transferred RI changing coating may have a large thickness range, since it can range from 1 nm to 500 µm, preferably from 10 nm to 300 µm. The invention is particularly useful for obtaining optical articles having a RI changing coating of more than 100 μm thickness.

In one embodiment of the invention, the refractive index (RI) of the deposited curable composition changes as it is cured and/or irradiated, and it can be made to vary between locations within the composition layer, depending on the spatial extent of curing and/or irradiation of the layer. The cured and/or irradiated volumes establish a three-dimensional spatial distribution of the RI profile within said layer.

The curable composition deposited at step b) preferably comprises monomers, pre-polymers, polymers and/or mixtures thereof, and optionally at least one polymerization initiator. It can be a polymerizable composition or an already partially or completely polymerized composition.

Deposition of said composition may be carried out, without limitation, by spin coating, dip coating, spray coating, brush coating, roller coating or vacuum deposition, depending on its nature. Spin coating and dip coating are preferred.

Step b) can also be carried out by casting a film of the curable composition on the carrier with the aid of a second carrier, such as described in the experimental part.

Once deposited, the curable composition has to be subjected prior to step e) to both a curing step, which can be a simple drying step, and a step allowing creation of a RI profile, which can be a curing step or an irradiation step. Both curing and RI profile generation steps can be combined in a single one, when the RI profile stems from the extent of curing of the composition. Example 1 of the invention illustrates this embodiment.

Generally, curing of the curable composition is performed before generating the RI profile, albeit both steps can be performed simultaneously.

Curing and/or irradiation of the layer which has been deposited at step b) is typically performed before deposition step d) of the layer of a composition capable of allowing adhesion. However, it is also possible to perform said curing and/or irradiation step(s) after deposition step d), even when said composition capable of allowing adhesion is deposited onto the layer which has been deposited at step b). Examples 2 and 3 of the invention illustrate the embodiment according to which creation of the RI profile is performed after step d) (more precisely, after step d1) which will be described later).

Curing of the curable composition may be induced by exposure to heat and/or radiation such as light, in particular ultraviolet (UV), visible, or infrared radiations, and/or any other curing initiating methods known in the art. Preferably, the curable composition is a radiation curable composition.

As used herein, "radiation curable composition" refers to a monomer, pre-polymer, polymer and/or mixture thereof that polymerizes and/or cross-links upon exposure to radiation.

In the case of light, the radiation source may have wavelengths ranging from 250 nm to 5000 nm. Preferably, curing of the curable composition is made by exposure to ultraviolet or visible radiation, more preferably ultraviolet radiation.

The carrier bearing a cured composition from which a RI changing layer could be generated can be stored and later used in the inventive process. It can be easily protected by means of an adequate packaging or a protective coating, which will be subsequently described.

In the present invention, irradiation of the layer which has been deposited at step b) of the present process can be employed in the frame of a curing process and/or a RI profile generation process. The irradiation treatment which is used to generate a RI profile may be carried out using the following radiations, without being limited to that list: light, in particular UV light, visible light (400-700 nm), or infrared radiations, an electric field, an electromagnetic field, microwaves, an electron beam, or a combination of those radiations.

Irradiation and/or curing times typically range from a few seconds to hours. Irradiation and radiation curing may be performed using classical UV lamps, Xe lamps, Hg lamps, high pressure Hg lamps, with or without a filter. The required wavelength or wavelength range and power of the lamp are dependent from the material to be irradiated and are easily determined by the person skilled in the art. Radiations required for curing/polymerizing a radiation curable composition are not necessary the same as those required for generating a RI profile, in the case of a radiation patternable layer.

In a preferred embodiment, the layer which is subjected to the RI profile generation step comprises compounds which undergo chemical transformations upon irradiation and/or curing resulting in modification of the refractive index of said layer.

When the curable composition is a polymerizable composition which exhibits a variable index of refraction as a function of the extent of its curing, a refractive index profile can be generated by controlling the extent of curing of said polymerizable composition, in other words its degree of polymerization and percentage of cross-linking between the polymerizable compounds within the curable composition. This embodiment is the first preferred embodiment of the invention and involves the creation of what will be called "a curing pattern" according to a pre-determined curing plan.

Any type of curable composition that exhibits a variable index of refraction as a function of the extent of its curing may be employed in that embodiment of the invention. Well known examples of those curable compositions, generally radiation curable polymerizable compositions, include urethane, thiol-ene, acrylate, cellulose ester, mercapto-ester or epoxy resin compositions.

The polymerizable curable composition may comprise at least one polymerization initiator, which is preferably a photo-initiator.

Photo-initiators can include alpha cleavage photo-initiators such as the benzoin ethers, benzyl ketals, acetophenone derivatives, phosphine oxides or acylphosphine oxides, hydrogen abstraction photo-initiators such as the benzophenone-type initiators, thioxanthones, camphorquinones, or bisimidazole, and cationic photoinitiators such as triaryl sulfonium salts, aryidiazonium salts, ferrocenium salts or aryliodonium salts.

Examples include benzophenone, 4-methylbenzophenone, benzyl dimethyl ketal, diethoxy acetophenone, benzoin methyl ether, 1-hydroxycyclohexyl phenyl ketone, 2-hydroxy-2-methyl-1-phenol-propane-1-one, 4-(2-hydroxyethoxy)phenyl-(2-hydroxy-2-methylpropyl) ketone, 2,4,6-trimethylbenzoyl diphenylphosphine oxide, bis(2,6-dimethoxybenzoyl)-2,4,4-trimethylpentyl phosphine oxide, 2,2-dimethoxy-2-phenyl acetophenone, 2-benzyl-2-N,N-dimethylamino-1-(4-morpholinophenyl)-1-butanone, and 2-methyl-1-[4-(methylthio)phenyl]-2-morpholino propan-1-one. The photoinitiator may be used alone or in combination with other photoinitiators, photoactivators and/or photosensitizers.

In another embodiment, free radical initiators that generate radicals upon exposure to heat rather than light ("thermal initiators"), for example, various peroxide initiators, are comprised in the polymerizable composition, alone or in combination with photoinitiators. Such thermal initiators are well known to those of skill in the art. In this case, heat or a combination of heat and irradiation may be employed to initiate the polymerization reaction.

The second preferred embodiment of the invention concerns RI changing layers, the RI profile of which is generated by exposure of predetermined regions of the layer of composition deposited during step b) of the inventive process to an appropriate radiation, resulting in chemical transformations other than polymerization which modify the refractive index of said layer. Chemical transformations through polymerization are related to the first preferred embodiment of the invention.

Examples of such chemical transformations, which are preferably photo-induced, are isomerization, dimerisation (which is herein not considered as a polymerization reaction), intramolecular or bimolecular cyclization (e.g., cycloadditions), elimination, locking of dopants, degradation such as scission, etc. Other photo-induced transformations include pericyclic reactions, such as electrocyclic reactions and sigmatropic rearrangements. The above transformations may be reversible or irreversible and preferably do not affect transparency of the RI changing layer.

This embodiment involves the creation of what will be called "an irradiation pattern" according to a pre-determined irradiation plan. Irradiation is preferably performed after the curable composition has been at least partially cured.

According to that second preferred embodiment of the invention, the layer which is subjected to the RI profile generation step comprises one or more materials or compounds prone to undergo one or more chemical transformations other than polymerization upon irradiation which modify the refractive index of said layer.

Photo-isomerizations are generally reversible and may concern compositions comprising at least one component selected from azobenzenes, polymers or copolymers having azobenzene groups, for example polyethers, polyurethanes, polyisophtalates, polythiophenes, polyacrylamides or polyacrylates having azobenzene groups, spirobenzopyrans, cyclopentenes, polymers or copolymers having cyclopentene groups, in particular bis(thienylethenes), bis(benzothienylethenes) and diarylethenes such as species incorporating 3-(2-thien-3-ylcyclopent-1-en-1-yl)thiophene groups, and mixtures thereof.

Compositions or layers comprising poly(vinyl cinnamate) or copolymers having vinyl cinnamate units may be subjected to photo-dimerization ([2+2] cycloaddition) resulting in cross-linking of the polymer network, which generally decreases the RI of the layer. Blends of poly(vinyl cinnamate) with one or more compounds chosen from poly(phenyl methyl silane), methyl trans-cinnamate or trans-cinnamic acid are also useful. As can be noted, vinyl cinnamate based compositions could also be considered to correspond to the first preferred embodiment of the invention.

Compositions or layers comprising polyimides doped with at least one photosensitizer may be subjected to photo-locking (fixing) of the photosensitizer in the matrix followed by UV cross-linking. Examples of useful sensitizers are benzoin ethyl ether (2-hydroxy-2-phenylacetophenone ethyl ether, the photo-locking of which generally decreases the RI of the layer) and benzildimethylketal (BDK, $C_6H_5COC(OCH_3)_2C_6H_5$).

Other examples of useful RI changing layers obtained by photo-locking are sol-gel derived inorganic-organic hybrid glass (HYBRIMER) films doped with the photo-initiator benzildimethylketal. Refractive index of those films increases by UV exposure due to photo-induced polymerization and photo-locking of high refractive index BDK. Their matrix may be obtained using methacryloxypropyl trimethoxysilane (MPTS), zirconium n-propoxide ($Zr(OC_3H_7)_4$) and methacrylic acid as precursors, which is described in "Fabrication of Channel Waveguides by Photochemical Self-Developing in Doped Sol-Gel Hybrid Glass", J. I. Jung, O. H. Park, B. S. Bae, Journal of Sol-Gel Science and Technology 26, 897-901, 2003.

Compositions or layers comprising diazo-polymers or copolymers, triazo-polymers or copolymers, azido-polymers or copolymers, copolymers thereof, and mixtures thereof may be subjected to photo-elimination. In the case of elimination of nitrogen molecules, RI of the layer is generally decreased. Diazo and triazo units may be part of a heterocycle, for example benzotriazole or 1,2,3,4-thiatriazole.

Compositions or layers based on sol-gel hybrid films formed from methacryloxypropyl siloxanes, such as 3-trimethoxysilylpropyl methylacrylate (MPTS) may undergo decomposition of the methacryl groups upon UV irradiation, which generally decreases the RI of the layer. An example of organic-inorganic hybrid material, which shows photo-induced reduction of refractive index, is a film prepared using a sol-gel method based on MPTS and heptadecafluorodecyl) trimethoxysilane (PFAS), which is described in "Photoinduced low refractive index in a photosensitive organic-inorganic hybrid material," J. U. Park, W. S. Kim, B. S. Bae, J. Mater. Chem. 13, 2003, 738-741.

The curable composition deposited at step b) of the inventive process, or the layer which is subjected to the RI profile generation step, may comprise any radiation-sensitive material showing a radiation-induced, preferably photo-induced, change in refractive index under appropriate irradiation conditions.

Compositions or layers comprising polysilane, polysilane-silica and/or titania hybrids, which may be formed by sol-gel reactions, may undergo photo-scission reactions of polysilane segments. After solvent rinsing, RI of the layer is generally decreased. Preferred polysilanes are poly(phenyl methyl silane), poly(dimethyl silane), poly(dihexyl silane), and their copolymers with 3-trimethoxysilylpropyl methylacrylate. Such photo-scission reactions are described for example in "Photoinduced refractive index changes in organic polysilane-inorganic hybrid thin films", Miura S.; Kobayashi A.; Naito H.; Matsuura Y.; Matsukawa K.; Inoue H., Synthetic Metals 137, 2003, pp. 1405-1406.

Compositions or layers comprising a polymer matrix and norbornadiene compounds dispersed therein, or polymers or copolymers having norbornadiene units may have their norbornadiene compounds or units changed to quadricyclane compounds or units by a radiation-triggered pericyclic reaction, which generally decreases the RI of the layer.

Compositions or layers comprising polymers or copolymers doped with nitrone group containing compounds, such as poly(methyl methacrylate), may have their nitrone groups changed to oxaziridine groups by cyclization upon irradiation, which generally decreases the RI of the layer. The nitrone group corresponds to the N-oxide of an imine group.

More generally, any curable or cured layer having a polymer matrix and small radiation-sensitive, preferably photosensitive molecules dispersed therein capable of showing a radiation-induced change in refractive index under appropriate irradiation conditions may be used in the frame of the invention.

Other useful compositions leading to RI changing layers following radiation induced structural change comprise copolymers of methyl methacrylate with methyl trans-cinnamate, trans-cinnamic acid or mixtures thereof, fulgide doped poly(methyl methacrylate) films, cyanine dye-doped polyimides.

The absolute value of the difference Δn of the index of refraction between cured (or irradiated) and uncured (or not irradiated) layers based on the above materials typically ranges from 0.001 to 0.25, preferably from 0.01 to 0.2.

Among the above cited chemical compounds or materials, which can be used as mixtures, some may exhibit photochromic properties. Cyclopentenes, polymers or copolymers having cyclopentene groups and polysilane-silica and/or titania hybrids are the ones that provide the largest refractive index changes upon irradiation.

According to a variant of the second preferred embodiment of the invention, the curable composition or the layer which is subjected to the RI profile generation step comprises compounds having a refractive index that can be altered by exposure to an electric or electromagnetic field, or precursors thereof.

Examples of such compounds are liquid crystal polymers, which are comprised of mesogenic units that can be preferentially oriented by the application of an electromagnetic field. In this case, the refractive index of the composition which has been deposited at step b) is preferably controlled by controlling the orientation of the mesogenic units. A variety of liquid crystal polymers having mesogenic units are know to those skilled in the art and can be employed herein. Curable compositions comprising such liquid crystal polymers are preferably cured by heating, during which step an electromagnetic field of pre-determined magnitude is preferably applied to create the RI profile.

Orientation, i.e., a RI profile, is not necessarily obtained by exposure of the curable (or cured) composition comprising those compounds to radiation. Liquid crystal polymers having mesogenic units may also be oriented by mechanical processing.

Other materials or systems having a refractive index that can be modified by exposure to an electric field are copolymers with ferroelectric liquid crystals, poly(alkylthiophene) opals, nanocrystal polycomposites, liquid crystal composites and photorefractive polymer-dispersed liquid crystals. They can be included as mixtures in the curable composition to be deposited at step b) of the inventive process, or formed therefrom.

It is worth noting that the first and the second preferred embodiments of the invention can be combined, allowing the creation of both a curing pattern and irradiation pattern within the composition deposited during step b) of the inventive process. In this case, the layer which is subjected to the step generating the RI profile comprises compounds which may undergo chemical transformations which modify its refractive index, chosen from both categories of compounds previously presented.

Figure 2:
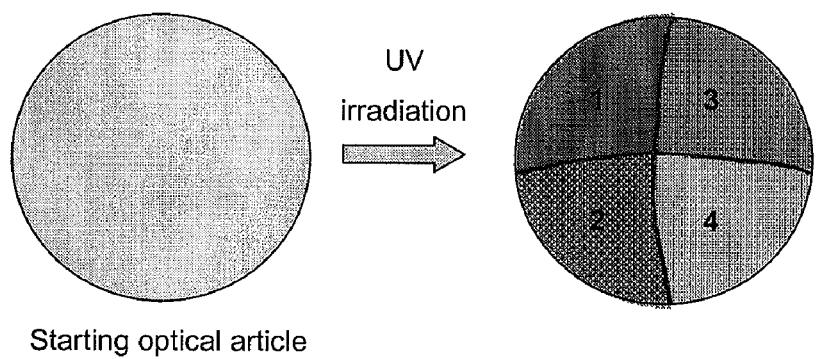
Figure 3:
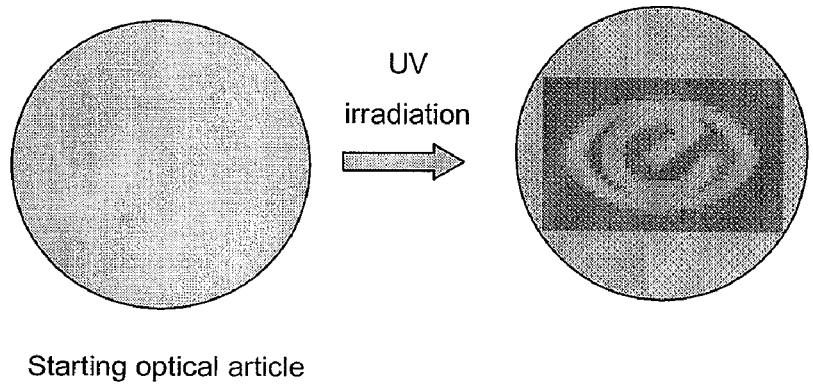

The deposited curable composition forms an adjustable refractive index layer, or "patternable layer," which offers the possibility to design any surface pattern, such as a logo pattern, etc. FIGS. 1 to 3 represent three customized patterns which have been created by implementation of the inventive process according to three distinct irradiation and/or curing plans, and which respectively correspond to examples 1 to 3 detailed in the experimental part. The final optical articles of FIGS. 1 and 2 respectively exhibit 8 and 4 distinct levels of refractive index, which in this case correspond to 8 and 4 different irradiation times. The final optical articles of FIG. 3 exhibits 2 distinct levels of refractive index, the spatial arrangement of which has been chosen to represent the ESSILOR logo.

While FIGS. 1 to 3 depict a number of refractive index profiles, it is to be appreciated that the incorporation of these different regions is merely exemplary, and alternative embodiments incorporating any number of regions are contemplated.

Obviously, the invention is not limited to the creation of the large resolution scale patterns depicted on FIGS. 1 to 3. Smaller scale patterns like micron scale patterns and even nanometer scale patterns may be formed using the inventive process, for example using nanopattern masks.

In a particular embodiment of the invention, the RI profile is a RI gradient. Three types of refractive index gradients are generally distinguished: an axial refractive index gradient, according to which the refractive index varies in a continuous way in a given direction and is homogeneous in any plane perpendicular to this direction; a radial (or cylindrical) refractive index gradient, according to which the refractive index varies continuously along the distance from a given axis and is homogeneous over any cylindrical surface of a given radius and having the same axis as the gradient; and a spherical refractive index gradient, according to which the refractive index varies continuously along the distance from a given point. In the latter case, the surfaces of constant index are spherical.

Methods for creating a refractive index profile are very diverse and only few of them will be presented, without the invention being limited to the particular embodiments disclosed.

By controlling the extent of curing and/or radiation (e.g., light) exposure across and through the surface of the composition deposited during step b) of the inventive process, a particular three dimensional refractive index profile can be produced.

Curing and irradiation processes may be modulated spatially or temporally. Position and scanning speed of the irradiation and/or curing source may vary. Irradiation and/or curing time or intensity (or power) may also vary, leading to cured and/or irradiated volumes within the composition having different sizes. Cured and/or irradiated volumes can be sequential and contiguous to each other or isolated from each other. The RI changing layer may comprise one or more sub-regions or areas having the same or a variety of refractive index profiles. Said sub-regions can have virtually any shape or local curvature.

The irradiation intensity is intended to mean the luminous power (expressed in watts per unit of area), also called illuminance.

The curing and/or irradiation process may be pre-programmed with the assistance of a computer, which makes easier the spatial and/or temporal variation of the intensity of illumination.

Numerous methods are available for delivering radiations to specific locations within the layer volume and are described for example in WO 2004/034095, which is incorporated herein by reference. When curing and/or irradiating involve a light beam, the focal point of the light beam is positioned at various points in the RI changing layer to establish the desired curing and/or irradiation pattern.

Deeper regions of the layer leading to the RI changing layer, i.e., regions which are the farthest from the curing and/or irradiation source are preferably cured and/or irradiated first.

Any control method of the radiation intensity delivered to the curable or already cured composition leading to the RI changing layer can be used, for example attenuation methods, methods using masks such as patterned masks or rotating masks exhibiting a profile of appropriate opaque regions, or controlling the current of the source. Conventional irradiation modulation techniques are described, for example, in French Patent 2661914 in the name of the applicant, which is incorporated herein by reference.

A first method of creating the RI profile of the present invention includes the creation of a curing and/or irradiation pattern by the selective illumination of portions of the composition deposited during step b) of the inventive process using a point light source, such as a laser. This selective illumination may be accomplished by varying the speed and/or intensity of the light source to vary the curing and/or irradiation of said composition.

Another method of creating the RI profile of the present invention includes the exposure of the composition deposited during step b) of the inventive process to an array of light emitting diodes (LEDs), optionally through a demagnifier or magnifier lens such as disclosed in WO 2004/015481, which is hereby incorporated by reference. These LEDs may be selectively illuminated such that different portions of the composition deposited during step b) of the inventive process are exposed to different levels of illumination.

This variance in illumination results in the creation of a layer having a varying index of refraction across its surface, and may include the formation of multiple sub-regions, where the index of refraction of the cured composition in a sub-region may be a constant index of refraction, with the index of refraction varying between adjacent sub-regions. Any other suitable source of illumination may be employed in the place of the LEDs array.

Yet another alternative method of creating the RI profile of the present invention includes the transmission of light through a liquid crystal display (LCD) containing a pre-determined curing and/or irradiation pattern, such as disclosed in WO 2004/015481. The LCD may be controlled by a computer to act as a spatial light intensity modulator.

As the LCD is exposed to radiation, radiation corresponding to the curing and/or irradiation pattern is transmitted through the LCD to the composition deposited during step b) of the inventive process, thus creating the desired refractive index profile.

The above methods describe obtaining a RI profile from the composition which has been deposited onto a main surface of the carrier during step b) of the inventive process. It is to be understood that the disclosed methods may be applied to a composition being in a curable state, but also in an at least partially cured state.

After exposure to radiation, such as UV light, in accordance with the foregoing teachings, said curable or cured composition generates a RI changing layer, which may contain completely cured and/or irradiated regions, partially cured and/or irradiated regions, uncured and/or non irradiated regions, and a mixture thereof.

Partially cured/irradiated and uncured/non irradiated regions may reveal unstable, since further exposure to radiation may change the structure of the RI changing layer. Thus, the performance of the optical article containing such unprotected RI changing layer may be altered to some extent with time, and particularly upon exposure to sunlight or UV radiation for extended periods.

To prevent undesirable further polymerization and/or other chemical transformations within the RI changing layer, the substrate of the optical article and/or at least one coating borne by the carrier may be chosen to exert a protecting role by absorbing and thus blocking radiations which are likely to alter the RI profile of the RI changing layer. Such coatings are called "radiation protective coatings" hereinafter. Radiation protective coatings may be present on both sides of the RI changing layer (or a protective substrate and a protective coating), but only one protective coating may be sufficient.

When protection is sought, said substrate and/or coating should be such that the radiations which may be absorbed by the RI changing layer are instead absorbed by said protective substrate and/or coating to such an extent that no appreciable change of the RI profile of said RI changing layer occurs when such an optical element is exposed to continuous daylight for at least one year, preferably at least two years.

Any classical functional coating may be modified so as to play the role of a coating protecting from a predetermined range of wavelengths in the final optical article, for example an impact resistant primer coating, an abrasion- and/or scratch resistant coating or an anti-fouling top coat. It is also possible to employ a coating which is especially dedicated to protection of the RI changing layer in a range of wavelengths.

Examples of protective coatings are UV protective coatings, which can be prepared from compositions containing at least one UV absorber in a sufficient amount to impart UV protective properties. Said sufficient amount can be easily determined by the person skilled in the art.

In a particular embodiment of the invention, the composition capable of allowing adhesion contains at least one UV absorber.

The substrate of the optical article may inherently exhibit radiation protective properties in at least one range of wavelengths, such as UV radiations. For example, it is well known that polycarbonate substrates strongly absorb UV radiations and may be employed to protect RI changing layers, the RI profile of which has been generated through UV irradiation.

When the substrate has no or insufficient radiation protective properties, it is also possible to treat the substrate of the optical article so as to block further radiation from reaching the uncured or partially cured regions of the RI changing layer, preferably by incorporating at least one UV absorber in the substrate.

UV absorbing compounds used to dope coatings and/or substrates, such that very little or no UV radiation passes through said coatings and/or substrates to reach the RI changing layer may be chosen from 4-aminobenzoic acid and salts thereof, anthranilic acid and salts thereof, salicylic acid and salts or esters thereof, in particular aryl hydroxy benzoates, 4-hydroxycinnamic acid and salts thereof, sulfonic derivatives of benzoxazoles, benzimidazoles or benzothiazoles and salts thereof, benzophenones, in particular sulfonic derivatives thereof, 2-hydroxybenzophenones and salts thereof, sulfonic derivatives of benzylidene camphor, and salts thereof, benzylidene camphor derivatives substituted with a quaternary ammonium group and salts thereof, phthalylidene derivatives of camphorsulfonic acid and salts thereof, benzotriazoles, in particular sulfonic derivatives thereof and salts thereof, oxalamides, oxanilides, and mixtures thereof.

When the RI changing layer is protected from UV, the transmittance for UV-A and UV-B bands is preferably decreased by 3 absorbance units, more preferably 5 absorbance units.

When radiation protection is conferred by at least one coating, said radiation protective coating is generally deposited onto the carrier before deposition of the layer leading to the RI changing layer, and may be or not in direct contact with the RI changing layer in the final optical article.

The radiation protective coating may be located at different positions in the coating stack to be transferred. In a preferred embodiment of the invention, the outermost coating of the carrier subjected to deposition step b) is a radiation protective coating. When a protective coating is needed in addition to the other classical functional coatings previously described, said radiation protective coating is preferably deposited onto an impact-resistant coating or an abrasion- and/or scratch-resistant coating borne by the carrier. In other embodiments, the radiation protective coating is interleaved between two functional coatings, for instance between an anti-reflection coating and an abrasion- and/or scratch-resistant coating, between an abrasion- and/or scratch-resistant coating and an impact-resistant coating or between an anti-reflection coating and an impact-resistant coating.

Preferably, it is not directly deposited onto the carrier or the optional releasing coating. Still preferably, the radiation protective coating is not interleaved between two layers of the anti-reflection coating.

Creation of the RI profile within the layer of composition which has been deposited at step b) and/or curing thereof may be performed before or after deposition of one or more other coating(s) onto said layer, for example after deposition of the composition capable of allowing adhesion (which may also be deposited onto a geometrically defined surface of the substrate) or after deposition of the protective coating, when such coating is present.

Actually, it is possible to cure and/or create a RI profile from the curable composition even if it is coated with a coating absorbing the radiation required for its curing and/or RI profile generation. In this case, said absorbing coating has to be transparent to other radiations which may trigger curing and/or RI profile generation by the intermediate of another chemical compound which may be activated with said other radiations. Said chemical compound may directly trigger a chemical process (e.g., by activating a polymerizable compound), or may trigger processes such as polymerization reactions by activating an initiator, for instance a photo-initiator, which will in turn initiate the polymerization.

An example of such embodiment is a curable composition comprising at least one non linear optical (NLO) material that produces UV photons when activated by visible or near infrared (IR) radiation, wherein UV photons are necessary for curing said curable composition and/or RI profile generation. Even if said curable composition (or said RI changing layer) is coated with a coating that absorbs UV light, UV photons generated by the NLO material upon appropriate irradiation can initiate polymerization and/or RI profile generation, provided that said absorbing coating transmits visible or near IR radiation, which can be produced by a laser source.

The NLO material can be a polymerization initiator, one of the monomers, pre-polymers or polymers in the RI changing layer, or a separate additive. A combination of several NLO materials having the same or different roles can be employed.

The NLO material should be chosen so as to emit photons having the required wavelength to initiate the polymerization process and thereby cure the polymerizable composition layer and/or the RI profile generation process. NLO materials are well known in the art and are described for example in WO 2004/106990, which is hereby incorporated by reference.

Another stability problem of the RI profile during the inventive process may arise when curing of a layer which has been deposited in a step subsequent to step b) involves a curing method which could affect the structure of the RI changing layer. For example, a RI profile which has been created by irradiation might be modified by radiation curing of a subsequently deposited coating, in particular during a radiation curing step g) of a composition capable of allowing adhesion.

To avoid this problem, a radiation protective coating can be employed in some cases, or the nature of the composition capable of allowing adhesion can be adapted so as to not require a curing and/or irradiation step which might modify the RI changing layer. In the case of a RI profile which has been generated by UV irradiation, examples of suitable compositions capable of allowing adhesion are heat-curable compositions, compositions that are curable under irradiation with visible light or UV-curable compositions with the proviso that both required irradiation wavelength ranges do not overlap. Even in the case of overlap in the required irradiation wavelength ranges, a UV-curable adhesive composition may be used, on the condition that said adhesive composition is deposited and UV-cured on the substrate of the optical article rather than the carrier and does not require an UV irradiation to be performed during step g). Examples of compositions which satisfy those requirements are UV-curable HMA or PSA compositions deposited onto the substrate, since step g) may only comprise a heating step in this case.

In one embodiment of the invention, the composition capable of allowing adhesion is not radiation curable, preferably not UV-curable.

It is worth noting that uncured resin mixture, when present, may be removed from the RI changing layer using a suitable solvent. Once removed, the volume previously occupied by the uncured resin mixture may be replaced with another or similar curable composition which optionally exhibits refractive index change when exposed to curing and/or irradiation.

By removing the uncured resin mixture and replacing its volume with an optically stable material, an optical article can be obtained that resists changes to its index of refraction under long term exposure to radiation sources. This is particularly useful in environments where the optical article would be exposed to sunlight or other light sources which might contain wavelengths which would cause further RI modification of the previously uncured resin mixture.

Typically, the total thickness of the coating(s) borne by the carrier to be transferred is from 1 to 500 μm, but is preferably from 10 nm to 300 μm.

The layer of composition capable of allowing adhesion mentioned in step d) is either formed onto the coating or stack of coatings borne by the carrier, or onto the geometrically defined surface of the substrate onto which the coating(s) is (are) transferred, preferably onto the coating or stack of coatings of the carrier. It should not impair the optical properties of the final optical article.

In the remaining of the present disclosure, it will be referred to as "the composition capable of allowing adhesion" or, when appropriate, "the adhesive composition."

Said composition capable of allowing adhesion for use in the coating transfer process is a curable coating composition which may be thermally-curable (heat-curable) or cured through light irradiation (light-curable or radiation-curable), in particular UV irradiation, or both heat- and light-curable. Such curing step is carried out in certain cases during step g) of the inventive process and results in a safe bonding of the coating stack borne by the carrier to the substrate of the optical article.

Of course, if the outermost coating borne by the carrier of the coating exhibits adhesion properties, for example is a pressure-sensitive adhesive (PSA), the deposition of a composition capable of allowing adhesion is not necessary and the requirements of step d) of the inventive process are considered to be fulfilled.

The composition capable of allowing adhesion may be deposited by any of the techniques known in the art, such as dip coating, flow coating, spin coating or dry transfer. When liquid, it may be dispensed as at least one drop at the center of the geometrically defined surface of the substrate or the exposed surface of the coating stack to be transferred, or as a pattern of drops, spread out firstly by spin coating or sprayed using a precision dispensing valve.

As used herein, the deposited layer of composition capable of allowing adhesion has not necessarily a continuous structure. It can have a discontinuous structure, for example when several drops of liquid are deposited at different locations of the deposition surface.

An important requirement is that, in the course of the pressure application step f), the composition capable of allowing adhesion be regularly spread on the entire geometrically defined surface of the optical article so that, after the optional heating or curing step, there is formed a coating layer or an adhesion interlayer covering the entire geometrically defined surface of the optical article. Consequently, the deposited amount of said composition must be sufficient.

Preferably, the composition capable of allowing adhesion forms at the beginning of step e) a layer having an even thickness. By even thickness, it is meant that the variation of thickness over the entire layer area has no consequence on the optical power of the final optical article.

The amount of said composition must also be sufficient to at least fill up the grooves (when present) of the surface roughness of the optical article and form a final uniform layer.

Concomitantly, the amount of said composition shall be kept as low as possible to prevent large overflowing of the composition at the periphery of the optical article for avoiding an additional cleaning step to eliminate the excess of said composition.

Said layer of composition capable of allowing adhesion may be formed according to two preferred manners, though other methods are available to the person skilled in the art.

According to the first preferred manner, the composition capable of allowing adhesion is an adhesive curable coating composition.

Said adhesive curable composition can be any curable adhesive composition or curable glue composition that will achieve, after curing, adhesion by forming an adhesive interlayer between the transferred coating stack and the surface of the optical article.

In particular, the adhesive curable composition can be any classical liquid curable composition typically used for forming functional coating layers for improving the optical and/or mechanical properties of an optical article, in particular an ophthalmic lens. For example, a primer coating composition for improving adhesion and/or impact resistant, an abrasion and/or scratch resistant coating composition, as well as other coatings compositions such as a polarized coating composition and a photochromic or dyeing coating composition can serve as a composition capable of allowing adhesion if they have adhesive properties.

Obviously, if a functional coating, for instance a primer coating, is employed as a composition capable of allowing adhesion, said functional coating need not to be present on the coated carrier provided in step a) of the inventive process.

The liquid curable glue or adhesive composition may comprise, without limitation, polyurethane compounds, epoxy compounds or (meth)acrylate compounds.

Preferred components of the liquid curable adhesive composition are acrylate compounds such as polyethylene glycol di(meth)acrylates, ethoxylated bisphenol A di(meth)acrylates, various trifunctional acrylates such as ethoxylated trimethylolpropane triacrylate and tris(2-hydroxyethyl)isocyanurate. Monofunctional acrylates such as isobornyl acrylate, benzyl acrylate, phenylthioethyl acrylate are also suitable. The above compounds can be used alone or in combination.

Suitable glues are commercially available from the Loctite Company.

The composition capable of allowing adhesion is preferably a liquid curable adhesive composition selected from the group consisting of pressure-sensitive adhesives (PSA) and hot-melt adhesives (HMA). In those cases, deposition step d) of the adhesive composition further comprises an additional step in which the deposited layer of adhesive composition is brought to a state in which it becomes unflowable under the process conditions, if said layer was not already in such a state at the end of step d). This means that, at least before moving step e) and pressing step f), the adhesive composition layer, if necessary, has been pre-cured or dried to a hardened state such that the layer will not be significantly spreadable over the deposition surface, in particular under the pressing and optional curing steps of the invention process. As a result, a dry PSA or HMA coating capable of allowing adhesion is obtained.

By "pressure-sensitive adhesive" (sometimes designated as "self-adhesive material"), it is meant a category of adhesives which are permanently tacky in dry form (solvent-free) at room temperature or at temperature of use. They are characterized by their ability to firmly adhere to a variety of dissimilar surfaces under a slight pressure by forming Van der Waals bonds with said surfaces. In any case, no other external energy (such as temperature, solvent, UV . . . ) but pressure is compulsory to form the adhesive joint. However, other external energy may be used to enhance the adhesive performance. PSAs are available into three forms: solvent born, water born (latex) and the form obtained by hot melt process.

A PSA based adhesive coating may be formed by evenly applying a PSA composition on either a geometrically defined surface of the substrate or the exposed surface of the coating stack borne by the carrier, followed by drying to an unflowable state by heating at a temperature typically ranging from 40° C. to 130° C.

When the composition allowing adhesion is selected from the group consisting of PSA compositions, applying heat during pressing step f) is only optional.

The families of PSAs are classified according to the main elastomer used in the adhesive formulation. The main families which may be used in the present invention are: natural rubber based PSAs, polyacrylates based PSAs (such as polyethylhexyl acrylate, poly n-butyl acrylate), styrenic block copolymers based PSAs [such as Styrene-Isoprene (SI), Styrene-Isoprene-Styrene (SIS), Styrene-Butadiene (SB), Styrene-Butadiene-Styrene (SBS)], and mixtures thereof. Styrene-butadiene random copolymers, butyl rubber, polyisobutylene, silicon polymers, synthetic polyisoprene, polyurethanes, polyvinyl ethyl ethers, polyvinyl pyrrolidone, and mixtures thereof, may also be used as main components for PSA formulations. For additional examples, see Sobieski et al., *Handbook of Pressure-Sensitive Adhesive Technology*, 2nd ed., pp. 508-517 (D. Satas, ed.), Van Nostrand Reinhold, New York (1989), incorporated by reference in its entirety.

The PSAs used in this invention are preferably selected from polyacrylate based PSAs and styrenic block copolymers based PSAs.

By "hot-melt adhesive", it is intended to mean a room temperature solid but flexible adhesive, which melts or drops in viscosity upon heating, and rapidly sets with cooling to create bonds, optionally in a reversible manner. An important property of HMAs is the ability to solidify or congeal or "set" very rapidly under normal ambient conditions, preferably almost instantaneously, when cooling down from the application temperature. They are available in dry form, or in solvent and latex based forms.

A HMA based adhesive coating may be formed by evenly applying a liquid HMA composition on either a geometrically defined surface of the substrate or the exposed surface of the coating stack borne by the carrier, followed by drying to an unflowable state by heating at a temperature typically ranging from 40° C. to 130° C.

Alternatively, a HMA based adhesive coating may be formed from a dry HMA composition by softening said composition by heating to the temperature where it will flow readily, then applying it to either a geometrically defined surface of the substrate or the exposed surface of the coating stack borne by the carrier, and finally hardening it by cooling.

When the composition allowing adhesion is a HMA composition, heat has to be applied during pressing step f) to obtain a good adhesion. Preferably, the HMA layer used in the present invention will not be flowable after heating of step g) because it is laminated in very tight conditions. So the variation of thickness of the adhesive layer in the final optical article, once the coatings are transferred, will typically be less than 2 microns.

Examples of polymers, which can be used in HMA compositions are solvent-free polyamides, polyethylene, polypropylene and other olefin-type polymers, polyurethanes, polyvinyl pyrrolidones, polyesters, poly(meth)acrylic systems, other copolymers thereof, and mixtures thereof. The hot-melt adhesives according to the invention are preferably selected from dry poly(meth)acrylic latexes, such as the acrylic latex commercialized under the name Acrylic latex A-639 by Zeneca, dry polyurethane latexes, such as the latexes commercialized under the names Witcobond® 240 and Witcobond® 234 by Baxenden, dry polyester latexes and mixtures thereof. Preferred latexes are polyurethane latexes. Other preferred latexes are core/shell latexes such as those described in U.S. Pat. No. 6,503,631 to Essilor and especially latexes based on alkyl(meth)acrylates such as butyl(meth)acrylate.

As is known in the art, if a polymer or polymer blend does not have the properties of a PSA or a HMA per se within the meaning of these terms as used herein, it can function as a PSA or a HMA by admixture with small quantities of additives for adjusting the tack (tackifiers), rheology characteristics (including viscosity, thixotropy, and the like), adhesive bond strength characteristics, rate of "set", low temperature flexibility etc.

The adhesive curable coating composition according to the above referred first preferred manner may also include additives such as an effective amount of a coupling agent (as defined above) in order to promote adhesion with the materials with which it will be contacted, classical dyes, a photochromic dyes and/or pigments.

In the final optical article, the thickness of the adhesive coating resulting from the above described curable coating composition is preferably less than 100 μm, more preferably ranges from 0.5 to 50 μm, better from 1 to 20 μm, still better from 1 to 10 μm, and is typically of 1-3 μm.

The second preferred manner for forming the layer of composition capable of allowing adhesion according to the invention will now be described. This time, the composition capable of allowing adhesion is a dry latex layer which will be activated with at least one drop of an aqueous composition, typically an aqueous solvent.

According to that embodiment, deposition step d) comprises the following steps:
d1) forming, either onto the exposed surface of the outermost coating borne by the carrier or the at least one geometrically defined surface of the substrate, a layer of a dry latex as a layer of a composition capable of allowing adhesion;
d2) depositing at least one drop of an aqueous composition either onto said at least one geometrically defined surface of the substrate, the exposed surface of said outermost coating borne by the carrier or onto the surface of the dry latex layer;

In this case, pressing step f) comprises:
f) pressing together the at least one geometrically defined surface of the substrate and the exposed surface of said outermost coating borne by the carrier, so as to spread the aqueous composition and form a thin pellicle of the aqueous composition between the dry latex layer and either the substrate or the exposed surface of the outermost coating borne by the carrier;

During pressing step f), a pressure is exerted generally to the carrier, so that the dry latex layer and aqueous composition drop are brought into contact, if they were not already.

According to that second preferred manner for forming the layer of composition capable of allowing adhesion, a heating step g) is performed so as to obtain adhesion in the final optical article:
g) heating the thin pellicle of aqueous composition and the dry latex layer during pressing step f);

The dry latex layer may be formed by applying liquid latex either onto the exposed surface of the outermost coating borne by the carrier, or onto at least one geometrically defined surface of the substrate. Application can be performed by any usual process such a dip coating, flow coating or spin coating. Thereafter, the deposited liquid latex layer is dried at room temperature or by heating. Usually, heating is performed at a temperature ranging from 40° C. to 130° C. and is preferably pursued until at least a tack free layer is obtained. Typically, heating lasts for 15 seconds to 15 minutes, from 60 to 100° C.

As it is well known, latexes are stable dispersions of particles of at least one polymer in an aqueous medium. Preferred latexes for forming the dry latex layer are polyurethane latexes, poly(meth)acrylic latexes, polyester latexes and mixtures thereof. The latex may comprise hydrophilic functional groups such as sulfonic or carboxylic acid groups. As examples, polyester sulfones, such as the aqueous composition Eastek® 12100-02-30% commercialized by Eastman Chemical Company, and polyurethane sulfones may be cited. Optionally, the latex is of the core-shell type.

Poly(meth)acrylic latexes are generally latexes of copolymers mainly formed from (meth)acrylate monomers, such as for example ethyl, butyl, methoxyethyl or ethoxyethyl (meth)acrylate, and generally from a minor amount of at least another co-monomer, such as for example styrene.

Preferred poly(meth)acrylic latexes are acrylate-styrene copolymer latexes, which are commercially available from ZENECA RESINS under the trade name NEOCRYL®, such as NEOCRYL® A-639, or from B. F. Goodrich Chemical Co. under the trade name CARBOSET®, such as CARBOSET® CR-714.

Preferred polyurethane latexes are polyurethane latexes comprising polyester moieties, preferably aliphatic polyester moieties. Still preferably, polyurethane units are obtained by polymerizing at least one aliphatic polyisocyanate with at least one aliphatic polyol. Those latexes provide coatings based on polyurethane having polyester moieties.

Such polyurethane-polyester latexes are commercially available from ZENECA RESINS under the trade name Neorez® (e.g., Neorez® R-962, Neorez® R-972, Neorez® R-986, Neorez® R-9603) or BAXENDEN CHEMICALS, a subsidiary of WITCO Corporation, under the trade name Witcobond® (e.g., Witcobond® 232, Witcobond® 234, Witcobond® 240, Witcobond® 242). Other commercially available polyurethane latexes are Bayhydrol® 121 or Bayhydrol® 140AQ, commercialized by H. C. Starck.

Most preferred latexes are polyurethane latexes.

Other preferred latexes are core/shell latexes such as those described in U.S. Pat. No. 6,503,631 in the name of the applicant and especially latexes based on alkyl (meth)acrylates such as butyl acrylate or butyl methacrylate.

In a preferred embodiment, the latex layer also includes an effective amount of a coupling agent (as previously defined) in order to promote adhesion of the latex layer with the substrate and/or the exposed surface of the coating stack borne by the carrier, in particular an abrasion and/or scratch-resistant coating, a primer coating or the RI changing coating.

The latexes may also comprise a classical dye or a photochromic dye. Latexes comprising a photochromic dye and methods for obtaining them are disclosed for example in the following patents: EP 1161512; U.S. Pat. No. 6,770,710; U.S. Pat. No. 6,740,699, all in the name of the applicant.

Generally, after drying and curing, the latex layer has a thickness ranging from 0.05 to 30 μm, preferably from 0.5 to 20 μm and better from 0.6 to 15 μm.

The latex layer may preferably constitute an impact-resistant primer coating in the final optical article. In this case, the latex layer preferably fulfills the preferred requirements of impact resistant primer coating, such as Tg (glass transition temperature) of the latex layer being less than 30° C.

Cured latexes, in particular polyurethane latexes, having a low glass transition temperature are preferred since they provide a better transfer and a better adhesion. Thus, the dry latex layer preferably has a Tg lower than 0° C., more preferably lower than −10° C., better lower than −20° C. and even better lower than −40° C.

Also, latexes having low "tacky" temperatures are preferred. Thus, preferred latexes have "tacky" temperatures ≦80° C., generally ranging from 40° C. to 80° C. preferably from 50° C. to 75° C.

The aqueous composition, at least one drop of which is deposited at step d2) of the inventive process, can be seen as an activating liquid, i.e., a liquid which, when contacting the dry latex layer under the processing conditions, in particular under heating, imparts to the dry latex layer adhesive properties.

The aqueous composition capable of activating the dry latex layer may be an aqueous solvent. It may be water, preferably deionized water, or a mixture of water and one or more classical organic solvents such as alkanols, typically $C_1$-$C_6$ alkanols such as for example methanol or ethanol. Preferably, the aqueous solvent does not comprise any organic solvent.

The activating aqueous composition can also be a latex composition, preferably a mixture of an aqueous solvent and a latex, such as preferably a polyurethane latex. In preferred embodiments, the latex used as an activating aqueous composition has a maximum dry extract of 20% by weight and better of maximum of 15% by weight.

The latexes usable as activating aqueous compositions are preferably the same as the latexes used for making the dry latex layer.

The amount of aqueous composition must be sufficient to form a continuous thin pellicle, preferably over the entire dry latex layer during the application process.

Typically, at least one drop of aqueous composition is deposited at the center of the geometrically defined surface of the substrate (when it is not coated with the dry latex layer), the exposed surface of the outermost coating borne by the carrier (when it is not coated with the dry latex layer), or onto the surface of the dry latex layer itself. Of course, a pattern of several drops of aqueous composition can also be used.

In the final optical article, the thickness of the adhesive coating resulting from the above described latex layer is preferably less than 100 μm, more preferably ranges from 1 to 50 μm, better from 1 to 25 μm, still better from 1 to 10 μm, and is typically of about 5 ∞m.

This second preferred manner for forming the layer of composition capable of allowing adhesion is disclosed extensively in U.S. patent application Ser. No. 11/048,136 filed on Feb. $1^{st}$, 2005, which is incorporated herein by reference.

The force applied in pressing step f) of the inventive process shall only be sufficient for spreading the deposited composition (if it was not already spread) but insufficient to impart any deformation to the substrate. It can be obtained by applying pressure, in particular air pressure or vacuum to the external surface of the carrier (i.e. the surface of the carrier which is not in contact with the composition allowing adhesion). Preferably, the pressure is first applied on the center part of the carrier and in a second step the pressure is radially increased towards the periphery of the substrate.

The applied pressure will depend on the sizes and curvatures of the substrate and carrier. Of course, the pressure needs to be maintained onto the carrier and substrate till enough adhesion of the coating stack to the substrate is obtained.

The exerted pressure will typically range from 0.35 to 4.2 bars (5 to 60 psi), preferably 0.35 to 3 bars and better 0.35 to 2.1 bars (5 to 30 psi). Certain compositions capable of allowing adhesion may not require to be spread during pressing step f), for example already cured adhesive coatings.

When vacuum is used for creating the application force, the typically applied force may be above 5 Newtons, preferably above 10 Newtons, more preferably above 15 Newtons. The typically applied force may be around 130 Newtons.

Air pressure may be applied using an inflatable membrane apparatus placed on the external surface of the carrier, as disclosed in international patent application WO 03/004255. A general description of a vacuum structure allowing transferring the coatings can be found in U.S. Pat. No. 4,242,162. The carrier of the process of the invention may be the inflatable membrane itself, in particular an inflatable membrane of an air accumulator apparatus.

In order to improve the conformation of a flexible carrier to the surface of the substrate onto which the coatings have to be transferred, especially if the transfer is implemented on the front surface of the substrate, one can use an additional means to increase the pressure on the carrier. Typically, one can use a pad, optionally deformable, which can conform to the general shape of the carrier and increase the pressure applied to the carrier.

When step g) involves heating or heat-curing, such step is typically performed at a temperature ranging from 40 to 130° C., preferably from 60 to 120° C., more preferably from 80 to 110° C. The heating source can be, without limitation, an air oven with temperature from 70 to 110° C., a hot water bath from 70° C. to 100° C., or an IR heat source or a microwave source. Heating time can be from a few minutes to 30 minutes, for example heat is applied for 3 to 30 minutes.

The present transfer process can be applied in the ophthalmic lens industry to produce improved lenses, but also in the field of photographic films, electronics packaging and imaging materials.

The embodiments disclosed and suggested herein may be used to diminish or remove any aberration in virtually any optical system. The optical article obtained by the inventive process may be used as a correcting element for use in conjunction with an optical system of limited optical quality, for instance to improve the resolution of viewing instruments, correct inherent static aberrations in optical imaging or diagnostic systems or aberrations that contribute to the degradation of the vision system of the human eye, for example localized defects in the cornea, crystalline lens and retina, or correct distortion in a light beam. This listing of uses of the present invention is merely exemplary, and is not intended to limit the scope of the invention whatsoever.

One exemplary application of the invention is to fabricate wavefront corrected optical articles intended to be placed in front of or onto a human eye, such as ophthalmic lenses. The purpose of such wavefront corrected optical articles is to modify the wavefront profile of a transmitted light wave to form a corrected wavefront profile, in order to correct all or part of the aberrations of the eye, e.g., lower order aberrations and/or higher order aberrations.

Once the optical defects to be corrected have been known, for example after examination of the patient's eye having aberrations, a RI profile suitable to correct those defects is determined, i.e., a RI profile that matches the profile of the wave sought to be compensated for. Such RI profile can be created according to a predetermined curing and/or irradiation plan which is implemented in accordance with the foregoing teachings.

Iterative adjustments of the RI profile may be necessary, due to the error factor inherent to curing and/or irradiation methods. Thus, curing and/or irradiation of the layer leading to the RI changing layer may be further performed until the ultimate RI profile is obtained, i.e., the RI profile allowing the optical article to exactly compensate for the target defects.

Seeing that the RI profile may be adjusted so as to produce localized wavefront correction tailored to an aberration of the eye of an individual, the present invention allows to manufacture optical articles that are entirely customized and optimized to the patient's individual requirements.

Optical articles may be produced having various vision zones corresponding to various RI profiles, for example personalized progressive addition lenses or lenses that give patients "supervision," i.e., lenses incorporating a supervision zone in which higher order aberrations of the patient's eye are corrected.

In a preferred embodiment, the RI changing coating comprises a plurality of regions, each of the regions being configured such that the refractive index profile within each of the regions corrects an aberration of the eye of an individual.

The process in accordance with the invention is fast, low cost, does not lead to damage of the substrate during transfer and allows realizing functionalization or customization according to any prescription from very diverse lens substrates.

Actually, customized RI changing layers can be easily transferred to any kind of substrate, for example low refractive index lens substrates, very high refractive index lens substrates, including polarized and photochromic lens substrates.

Other advantages of the inventive process include a low working temperature (generally $\leq 110°$ C.), the use of environmentally friendly solvents (water), flexibility (dip, spin or spray coating process are available), transfer to most substrates with good adhesion and the production of optical articles having high transmittance and low haze.

The final optical article having the RI changing layer transferred to its surface exhibits little or no absorption in the visible spectrum, which means herein that when coated on one side according to the inventive process, the optical article has a luminous absorption in the visible range of preferably 1% or less, more preferably less than 1%, and/or a relative light transmission factor in the visible spectrum, $\tau v$, preferably higher than 90%, more preferably higher than 95%, and even more preferably higher than 96%. Preferably, both features are simultaneously satisfied and can be reached by carefully controlling thicknesses of the coatings.

"Luminous transmittance" or "relative light transmission factor in the visible spectrum" $\tau v$ is defined in the standard ISO 13666:1998 and is measured according to the standard ISO 8980-3 (380-780 nm wavelength range).

The final optical articles prepared according to the invention preferably have low haze characteristics. Haze is a measurement of the transmitted light scattered more than 2.5° from the axis of the incident light. The smaller the haze value, the lower the degree of cloudiness. The haze value of the present optical articles is preferably less than 0.8%, and more preferably less than 0.5%.

The invention also concerns a coated carrier for use in the process according to the invention. Said coated carrier has a main surface bearing a coating having at least one region which exhibits a refractive index profile, and is such as described above.

In a preferred embodiment of the invention, the coated carrier bears a stack of coatings comprising, starting from the carrier main surface, optionally a layer of protecting and releasing coating, an anti-fouling top coat, an anti-reflection coating, an abrasion- and/or scratch-resistant coating (hard coat), optionally an impact-resistant primer coating, the coating having at least one region which exhibits a refractive index profile and optionally a radiation protective coating.

Generally, the carrier has a concave surface and a convex surface and preferably bears the coating stack on its convex surface so as to be able to transfer said coating stack to the concave surface of the substrate of an optical article.

A layer of an adhesive composition may optionally be deposited on the exposed surface of the outermost coating borne by the inventive carrier. By "adhesive composition", it is meant a composition capable of allowing adhesion of a geometrically defined surface of the substrate of an optical article to the exposed surface of the outermost coating borne by the carrier. Said adhesive composition has been described previously and may be in a cured or curable state.

It is adhesive by itself or can be rendered adhesive. An example of such a composition which can be rendered adhesive is a dry latex layer which will be activated with at least one drop of an aqueous composition, such as previously described.

The inventive coated carrier can be protected by means of a protective coating, such as a radiation protective coating, or by means of an adequate packaging or container. The radiation protective coating can be a permanent coating, i.e. a coating which is intended to be transferred onto the substrate of an optical article, or a non permanent coating such as a peelable film. The inventive carrier may be stored and later used in the process of the invention.

The invention is further illustrated by the examples described below. These examples are meant to illustrate the invention and are not to be interpreted as limiting the scope of the invention.

EXAMPLES

1. Experimental Details a) General Considerations

In examples 1 to 3, a coated carrier called "HMC-coated carrier" was employed. It is a spherical polycarbonate (PC) carrier with 6.0 base curve bearing on its convex surface a coating stack including, starting from the naked carrier ("HMC carrier"), a protecting and releasing coating (which will not be transferred and will stay on the carrier once the coating stack has been transferred), an anti-fouling top coat, an anti-reflection coating, an abrasion and/or scratch-resistant coating and an impact resistant primer coating. Preparation of the HMC-coated carrier is fully described in U.S. Pat.

Appl. No. 2005/250870 and U.S. Pat. No. 6,562,466 which are hereby incorporated by reference.

The optical articles coated in the below described experiments were production ophthalmic lenses with 5.5 base (power: −2.00) sold under the name Airwear™ by Essilor, which comprise a polycarbonate (PC) substrate. The lenses had their concave sides coated according to the inventive process.

Example 1 corresponds to the first preferred embodiment of the invention, which involves the creation of what has been called a curing pattern. Curing of the curable composition which has been deposited at step b) and generation of the RI profile have been performed simultaneously and before deposition of the layer of a composition capable of allowing adhesion.

Examples 2 and 3 correspond to the second preferred embodiment of the invention, which involves the creation of what has been called an irradiation pattern. Generation of the RI profile has been performed after curing of the curable composition which has been deposited at step b).

b) Example 1

Step b) of the inventive process was performed using an acrylic monomer composition comprising 40% by weight of NS-140 (bisphenol A diethyleneglycol dimethacrylate) and 60% by weight of S2-EG9, (bis(ethyl)thiomethacrylate sulphide) with 0.5% by weight of Irgacure® 184 as a photoinitiator.

A RI changing layer was obtained by casting a film of the above described curable composition on the HMC-coated carrier with the aid of a second carrier. This casting process will be easily understood with reference to FIG. 4, which illustrates this particular embodiment of the invention. For clarity reasons, the layer of protecting and releasing coating borne by the HMC carrier 2 is not represented on FIG. 4.

Said second carrier 3 had its concave main surface coated with a layer of protecting and releasing coating 4.

Figure 4:
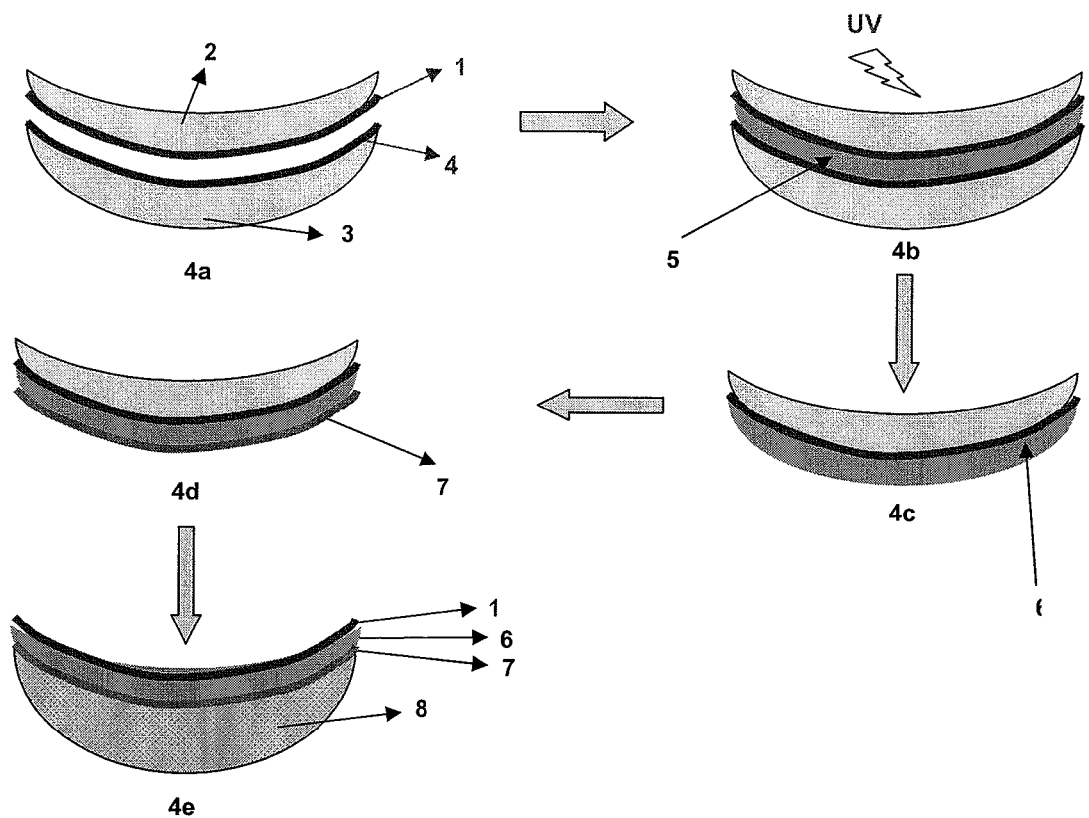
FIG. 4 represents schematic cross-section views of the main steps of a process for transferring a coating stack comprising a layer having a variable refractive index onto at least one geometrically defined surface of a substrate, in which the layer of adhesive composition was deposited onto the exposed surface of said coating stack.

The curable composition 5 (namely, the acrylic monomer composition) was dropped or injected and set in between the HMC-coated carrier 2 (which bears a stack of functional coatings 1) and the second carrier 3 (stage 4b of FIG. 4). As shown in stage 4a of FIG. 4, the HMC carrier 2 having coatings on its convex main surface was placed on the top, and the second carrier 3 coated on the concave side was placed at the bottom.

Then, curing of the curable composition and creation of the RI profile shown in FIG. 1 were simultaneously performed using a UV source facing the concave side of the HMC carrier 2 and an adequate patterned mask inserted between the HMC carrier and the UV source.

All regions of the curable composition layer were irradiated for at least 20 seconds so as to make it become a hard gel (or solid state). Irradiation times were increased when shifting from region 1 to region 8. The predetermined irradiation/curing plan which was employed and the resulting refractive indexes of the different regions are detailed in table 1.

The maximum refractive index increase from the initial liquid monomers to the solid state under UV irradiation was obtained in region 8 ($\Delta n_{max}$=0.0252). Theoretically, a $\Delta n$ value of 0.06 could have been obtained using a longer UV-curing time.

After patterning, the carrier 2 with the protective and releasing coating 4 attached to it were peeled off through air blow (stage 4c). The HMC-coated carrier attached with the RI changing layer 6 was then spin-coated with a layer of a composition capable of allowing adhesion 7, which was a composition based on Witcobond® 234 (polyurethane latex layer). Said layer was oven dried at 60° C. for 10 minutes (stage 4d). Alternatively, air drying for 30 minutes could have been performed.

The lenses were corona discharge treated using a 3DT equipment. The lenses went in front of the discharge head at a speed of 17 mm/s. There were 4 passes with a 5 s delay between each pass. Then the lenses were lowered down in order to treat their upper part and went through another set of 4 passes with 5 seconds delay in between at a speed of 17 mm/s. Corona power was applied under 15000 or 20000 volts.

Then, a few drops of water were deposited onto a concave Airwear™ lens surface (substrate 8). The coated carrier was set on the Airwear™ lens into a membrane apparatus, and an air pressure of 20-25 psi was applied. The membrane apparatus with the assembly of coated carrier and lens were kept for about 30 minutes in an oven at 110° C. under the same pressure, taken out from the oven and cooled down to room temperature.

The pressure was released; the carrier was removed, providing a lens having a coating stack comprising a 8 region RI changing coating transferred to its surface (stage 4e of FIG. 4).

Table 2 gives the thickness of the HMC carrier (naked carrier) and its thickness after deposition of the whole stack to be transferred (glue layer/RI changing layer/HMC coating/carrier) in the inventive process at five different points chosen randomly. The average thickness of the transferred coatings was 160 µm.

TABLE 2

| Thickness (mm) | Random five spots | | | | | Average |
|---|---|---|---|---|---|---|
| HMC carrier | 0.60 | 0.62 | 0.61 | 0.61 | 0.60 | 0.61 |
| Carrier at stage 4d | 0.77 | 0.76 | 0.78 | 0.78 | 0.77 | 0.77 |
| Thickness of the layer | 0.17 | 0.14 | 0.17 | 0.17 | 0.17 | 0.16 | c) Example 2

Step b) of the inventive process was performed using a curable composition comprising a 1:1 weight ratio mixture of

TABLE 1

| | Region* | | | | | | | |
|---|---|---|---|---|---|---|---|---|
| | 1 | 2 | 3 | 4 | 5 | 6 | 7 | 8 |
| UV irradiation time | 20 s | 23 s | 25 s | 28 s | 40 s | 43 s | 45 s | 48 s |
| Refractive index | 1.5718 | 1.5754 | 1.5780 | 1.5793 | 1.5917 | 1.5937 | 1.5959 | 1.5970 |

*Spatial arrangement of the regions is shown in FIG. 1.

polyvinyl cinnamate (PVCm) and poly(phenyl methyl silane) (PPMS) dissolved in tetrahydrofuran to make a 10% by weight solution.

A thin polymer blend film of 1.5 μm thickness being the precursor of a RI changing layer 6 (see FIG. 4) was obtained by casting a film of the above described curable composition on the HMC-coated carrier with the aid of a second carrier 3 such as described in example 1.

The curable composition set between the HMC-coated carrier 2 and the second carrier 3 was cured by air or oven drying. The second carrier 3 with the protective and releasing coating 4 attached to it were peeled off through air blow and the HMC-coated carrier coated with the cured PVCm/PPMS layer was spin-coated with a layer of a composition capable of allowing adhesion 7, which was a polyurethane latex layer based on Witcobond® 234. Said layer was oven dried at 60° C. for 10 minutes. Alternatively, air drying for 30 minutes could have been performed.

Then, creation of the RI profile shown in FIG. 2 was performed using a UV source facing the concave side of the HMC carrier 2 and an adequate patterned mask inserted between the HMC carrier and the UV source. Four different refractive index regions were created using irradiation times from 0 to 6 minutes. The predetermined irradiation plan which was employed and the resulting refractive indexes of the different regions are detailed in table 3.

TABLE 3

| | Region* | | | |
|---|---|---|---|---|
| | 1 | 2 | 3 | 4 |
| UV irradiation time | 0 | 2 min | 4 min | 6 min |
| Refractive index | 1.6144 | 1.5918 | 1.5863 | 1.5827 |

*Spatial arrangement of the regions is shown in FIG. 2.

The maximum refractive index decrease from the initial cured film to the final film under UV irradiation was obtained in region 4 ($\Delta n_{max}=-0.0317$). Theoretically, a $\Delta n$ value of 0.05 could have been obtained using a longer UV irradiation time.

Then, a few drops of water were deposited onto a concave Airwear™ lens surface. The coated carrier was set on the Airwear™ lens (which has been previously corona pretreated as described in example 1), into a membrane apparatus, and an air pressure of 20-25 psi was applied. The membrane apparatus with the assembly of coated carrier and lens were kept for about 30 minutes in an oven at 110° C. under the same pressure, taken out from the oven and cooled down to room temperature.

The pressure was released; the carrier was removed, providing a lens having a coating stack comprising a 4 region RI changing coating transferred to its surface.

d) Example 3

Step b) of the inventive process was performed using a curable composition comprising a 3:7 weight ratio mixture of α-(4-N,N-dimethylaminophenyl)-N-phenyl nitrone and poly (methyl methacrylate) dissolved in tetrahydrofuran to make a 10% by weight solution.

A thin cured polymer film of 1-2 μm thickness being the precursor of a RI changing layer was prepared such as described in example 2.

The remaining steps of the process were the same as in example 2, except that the RI profile shown in FIG. 3 was created, corresponding to an Essilor logo. Two different refractive index regions were created using irradiation times of 0 or 60 seconds (the darker region in FIG. 3 is the UV irradiated region). The predetermined irradiation plan which was employed and the resulting refractive indexes of the different regions are detailed in table 4.

TABLE 4

| | Region* | |
|---|---|---|
| | Essilor logo region | Dark region |
| UV irradiation time | 0 | 60 s |
| Refractive index | 1.5495 | 1.5336 |

*Spatial arrangement of the regions is shown in FIG. 3.

The refractive index decrease from the initial cured film to the final film under UV irradiation was $\Delta n=-0.0159$.

Thus, a lens was obtained having a coating stack transferred to its surface that comprises a layer patterned according to the Essilor logo.

Figure 5:
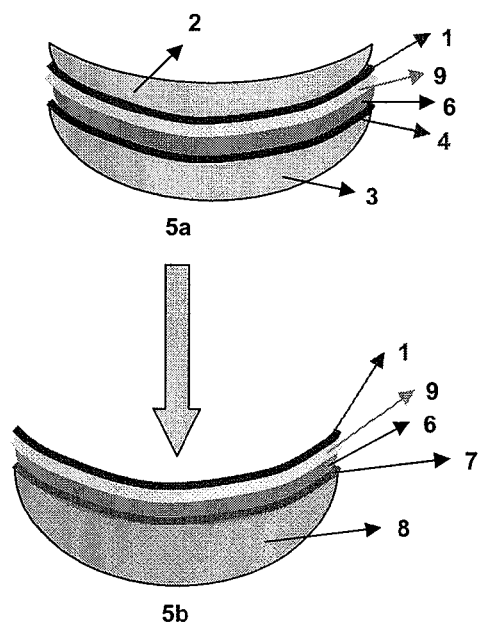
FIG. 5 represents schematic views of the main steps of a particular embodiment of the coating transfer process according to the invention, in which the coating exhibiting a refractive index profile has been protected from UV radiations.

Referring now to FIG. 5, a non-limiting embodiment of the invention involving a UV-blocking layer 9 is shown.

The carrier provided in step a) of the inventive process (HMC carrier 2 in FIG. 5) is successively coated with a stack of functional coatings 1 and a UV blocking layer 9. Stage 5a is reached after a refractive index changing layer 6 is formed by firstly casting a film of a curable composition 5 on the HMC-coated carrier with the aid of a second carrier 3 such as disclosed in example 1, and secondly subjecting said curable composition 5 to a predetermined irradiation/curing plan, for instance the one disclosed in example 1.

Then, the carrier 2 with the protective and releasing coating 4 attached to it can be peeled off through air blow and the coating stack borne by the carrier can be transferred to a lens substrate 8 by implementing the process of the invention, using a layer of composition allowing adhesion 7. This provides a lens having a coating stack comprising a RI changing coating transferred to its surface, said RI changing coating being in an environment in which it is protected from UV radiations (stage 5b).

While the present methods may be adaptable to various modifications and alternative forms, specific embodiments have been shown by way of example. The different aspects of the disclosed methods, articles and compositions may be utilized in various combinations and/or independently. However, it should be understood that the present methods, articles and compositions are not to be unduly limited to only those particular illustrative embodiments set forth herein, but rather may include numerous other combinations and modifications. Those of skill in the art will understand that the present methods, articles and compositions cover all modifications, equivalents, and alternatives falling within the scope of the claims.

The invention claimed is:

1. A process for transferring a coating or a stack of coatings borne by a removable carrier onto at least one geometrically defined surface of the substrate of an optical article, said carrier bearing an outermost coating having an exposed surface, comprising:
   a) obtaining a carrier having a main surface;
   b) depositing a layer of a curable composition onto the main surface of the carrier;
   c) obtaining an optical article comprising a substrate having at least one geometrically defined surface;

d) depositing either onto the exposed surface of the outermost coating borne by the carrier or onto said at least one geometrically defined surface of the substrate a layer of a composition capable of allowing adhesion of said exposed surface to said at least one geometrically defined surface of the substrate;

e) moving the carrier and the optical article relatively to each other to bring the deposited layer of composition capable of allowing adhesion into contact with either said at least one geometrically defined surface of the substrate or said exposed surface;

f) pressing together the at least one geometrically defined surface of the substrate and the exposed surface of the outermost coating borne by the carrier, said layer of composition capable of allowing adhesion lying there between;

g) optionally, heating or curing the layer of composition capable of allowing adhesion during pressing step f);

h) stopping pressing step f); and i) withdrawing the removable carrier to recover an optical article having a substrate coated with at least one coating adhering to said at least one geometrically defined surface through the layer of composition allowing adhesion, wherein the layer which has been deposited at step b) is cured prior to step e) and subjected prior to step e) to a treatment step allowing to obtain a coating having at least one region which exhibits a refractive index profile, wherein said refractive index profile is obtained by:

subjecting the layer of the curable or cured composition to an irradiation, wherein the composition comprises compounds that undergo an irreversible chemical transformation, resulting in modification of the refractive index of the layer, or controlling the extent of curing the layer of the curable composition, wherein the curable composition exhibits a variable index of refraction as a function of the extent of its curing.

2. The process of claim 1, wherein the treatment step allowing to obtain a refractive index profile is a curing and/or irradiation treatment according to a predetermined curing and/or irradiation plan.

3. The process of claim 2, wherein the irradiation treatment is carried out using a radiation chosen from UV light, visible light, an infrared radiation, an electric field, an electromagnetic field, microwaves, an electron beam, or a combination of those radiations.

4. The process of claim 1, wherein said layer of a curable composition is deposited onto an impact-resistant coating or an abrasion- and/or scratch-resistant coating borne by the carrier.

5. The process of claim 1, wherein the coating having a refractive index profile has a thickness ranging from 1 nm to 500 μm.

6. The process of claim 1, wherein the coating having a refractive index profile has a thickness higher than 100 μm.

7. The process of claim 1, wherein the carrier which is obtained at step a) bears one or more functional coatings selected from an anti-fouling top coat, an anti-reflection coating, an anti-abrasion- and/or scratch-resistant coating, an impact-resistant coating, a polarized coating, a photochromic coating, an antistatic coating, a dyed coating, a printed layer, a microstructured layer.

8. The process of claim 1, wherein the coating having a refractive index profile is in contact with the layer of composition capable of allowing adhesion in the recovered optical article.

9. The process of claim 1, wherein curing of said curable composition is induced by exposure to heat and/or radiation.

10. The process of claim 1, wherein said curable composition is a radiation curable composition which is cured by exposure to ultraviolet or visible radiation.

11. The process of claim 1, wherein said layer which is subjected to a treatment step allowing to obtain a refractive index profile comprises compounds which undergo irreversible chemical transformations upon irradiation resulting in modification of the refractive index of said layer.

12. The process of claim 1, wherein said curable composition is a polymerizable composition which exhibits a variable index of refraction as a function of the extent of its curing.

13. The process of claim 1, wherein said layer which is subjected to a treatment step allowing to obtain a refractive index profile has a polymer matrix and small radiation-sensitive molecules dispersed therein capable of an irreversible radiation-induced change in refractive index.

14. The process of claim 1, wherein the recovered optical article comprises a radiation protective coating which protects the at least one region having a refractive index profile from a range of wavelengths.

15. The process of claim 1, wherein the outermost coating of the carrier subjected to deposition step b) is a radiation protective coating.

16. The process of claim 1, wherein the substrate of the optical article exhibits radiation protective properties in at least one range of wavelengths.

17. The process of claim 1, wherein the composition capable of allowing adhesion is not UV-curable.

18. The process of claim 1, wherein the composition capable of allowing adhesion is a curable coating composition which is heat-curable and/or light-curable.

19. The process of claim 1, wherein the composition capable of allowing adhesion is an adhesive curable coating composition selected from the group consisting of pressure-sensitive adhesives and hot-melt adhesives.

20. The process of claim 1, wherein step d) comprises:

d1) forming, either onto the exposed surface of the outermost coating borne by the carrier or the at least one geometrically defined surface of the substrate, a layer of a dry latex as a layer of a composition capable of allowing adhesion;

d2) depositing at least one drop of an aqueous composition either onto said at least one geometrically defined surface of the substrate, the exposed surface of said outermost coating borne by the carrier or onto the surface of the dry latex layer; and wherein steps f) and g) respectively comprise:

f) pressing together the at least one geometrically defined surface of the substrate and the exposed surface of said outermost coating borne by the carrier, so as to spread the aqueous composition and form a thin pellicle of the aqueous composition between the dry latex layer and either the substrate or the exposed surface of the outermost coating borne by the carrier; and g) heating the thin pellicle of aqueous composition and the dry latex layer during pressing step f).

21. The process of claim 20, wherein said latex is selected from a polyurethane latex, a poly(meth)acrylic latex, a polyester latex and mixtures thereof.

22. The process of claim 20, wherein said aqueous composition is selected from an aqueous solvent, a latex composition, or a mixture of an aqueous solvent and a latex.

23. The process of claim 1, wherein the optical article is an ophthalmic lens.

24. A process for transferring a coating or a stack of coatings borne by a removable carrier onto at least one geometrically defined surface of the substrate of an optical article, said carrier bearing an outermost coating having an exposed surface, comprising:
  a) obtaining a carrier having a main surface;
  b) depositing a layer of a curable composition onto the main surface of the carrier;
  c) obtaining an optical article comprising a substrate having at least one geometrically defined surface;
  d) forming, either onto the exposed surface of the outermost coating borne by the carrier or the at least one geometrically defined surface of the substrate, a layer of a dry latex as a layer of a composition capable of allowing adhesion and depositing at least one drop of an aqueous composition either onto said at least one geometrically defined surface of the substrate, the exposed surface of said outermost coating borne by the carrier or onto the surface of the dry latex layer;
  e) moving the carrier and the optical article relatively to each other to bring the deposited layer of composition capable of allowing adhesion into contact with either said at least one geometrically defined surface of the substrate or said exposed surface;
  f) pressing together the at least one geometrically defined surface of the substrate and the exposed surface of said outermost coating borne by the carrier, so as to spread the aqueous composition and form a thin pellicle of the aqueous composition between the dry latex layer and either the substrate or the exposed surface of the outermost coating borne by the carrier; and
  g) heating the thin pellicle of aqueous composition and the dry latex layer during pressing step f);
  h) stopping pressing step f); and
  i) withdrawing the removable carrier to recover an optical article having a substrate coated with at least one coating adhering to said at least one geometrically defined surface through the layer of composition allowing adhesion,
  wherein the layer which has been deposited at step b) is cured prior to step e) and subjected prior to step e) to a treatment step allowing to obtain a coating having at least one region which exhibits a refractive index profile.

25. The process of claim 24, wherein said latex is selected from a polyurethane latex, a poly(meth)acrylic latex, a polyester latex and mixtures thereof.

26. The process of claim 24, wherein said aqueous composition is selected from an aqueous solvent, a latex composition, or a mixture of an aqueous solvent and a latex.

* * * * *

UNITED STATES PATENT AND TRADEMARK OFFICE
CERTIFICATE OF CORRECTION

PATENT NO. : 7,935,212 B2  
APPLICATION NO. : 11/461232  
DATED : May 3, 2011  
INVENTOR(S) : Peiqi Jiang et al.

Page 1 of 1

It is certified that error appears in the above-identified patent and that said Letters Patent is hereby corrected as shown below:

On the title page, item (73) Assignee, delete  
"Essilor International Compagnie, Generale d'Optique Charenton-le-Pont (FR)"  
and insert  
--Essilor International Compagnie Generale d'Optique, Charenton-le-Pont (FR)-- therefor.

Signed and Sealed this  
Sixth Day of September, 2011

David J. Kappos  
*Director of the United States Patent and Trademark Office*